(12) United States Patent
Nagasaka

(10) Patent No.: US 8,330,307 B2
(45) Date of Patent: Dec. 11, 2012

(54) LINEAR MOTOR, LINEAR MOTOR SYSTEM, AND ELECTRONIC-CIRCUIT-COMPONENT MOUNTING MACHINE INCLUDING THE LINEAR MOTOR

(75) Inventor: Keiji Nagasaka, Hekinan (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 353 days.

(21) Appl. No.: 12/654,688

(22) Filed: Dec. 29, 2009

(65) Prior Publication Data

US 2010/0181848 A1 Jul. 22, 2010

(30) Foreign Application Priority Data

Jan. 20, 2009 (JP) ................................ 2009-010319

(51) Int. Cl.
*H02K 41/02* (2006.01)

(52) U.S. Cl. .................... 310/12.29; 310/12.21; 310/43; 310/52; 310/54; 310/179; 310/184; 310/208; 310/268

(58) Field of Classification Search ............... 310/12.21, 310/12.29, 43, 52, 54, 179, 184, 208, 268; H02K 41/02
See application file for complete search history.

(56) References Cited

U.S. PATENT DOCUMENTS

| | | | | |
|---|---|---|---|---|
| 3,801,843 A * | 4/1974 | Corman et al. ............... | 310/52 |
| 6,005,310 A | 12/1999 | Mosciatti et al. | |
| 6,407,471 B1 * | 6/2002 | Miyamoto et al. ......... | 310/12.06 |
| 6,789,305 B2 * | 9/2004 | Seki et al. ..................... | 29/596 |
| 7,095,485 B2 * | 8/2006 | Hol et al. ....................... | 355/72 |
| 2004/0227412 A1 * | 11/2004 | Tamai ............................ | 310/12 |
| 2004/0245882 A1 * | 12/2004 | Horie et al. .................. | 310/194 |
| 2005/0093393 A1 * | 5/2005 | Hirzel ........................... | 310/268 |
| 2006/0238061 A1 * | 10/2006 | Hoppe et al. ................. | 310/183 |
| 2007/0194650 A1 * | 8/2007 | Ito et al. ....................... | 310/179 |
| 2008/0036305 A1 * | 2/2008 | Raos ............................. | 310/14 |
| 2010/0181848 A1 * | 7/2010 | Nagasaka ................. | 310/12.29 |

FOREIGN PATENT DOCUMENTS

| | | |
|---|---|---|
| JP | A-2000-37070 | 2/2000 |
| JP | A-2002-34230 | 1/2002 |

* cited by examiner

*Primary Examiner* — John K Kim
(74) *Attorney, Agent, or Firm* — Oliff & Berridge, PLC

(57) ABSTRACT

A linear motor including permanent magnets fixed on an elongate yoke such that polarities of the permanent magnets alternately change, and an armature having cores and coils wound on the respective cores, wherein each row of the permanent magnets and the armature are moved relative to each other along a straight line by application of an electric current to the coils, each core extending in a first direction perpendicular to the permanent magnet row, the cores being arranged in a second direction perpendicular to the first direction and disposed on the cores such that the coils on the cores adjacent to each other are arranged in a zigzag pattern and spaced apart from each other in the first direction, with a gap left therebetween, wherein the armature includes a heat pipe having opposite end portions one of which is inserted in the gap and the other of which extends outwardly of the gap, and fins fixed to the other end portion of the heat pipe.

18 Claims, 29 Drawing Sheets

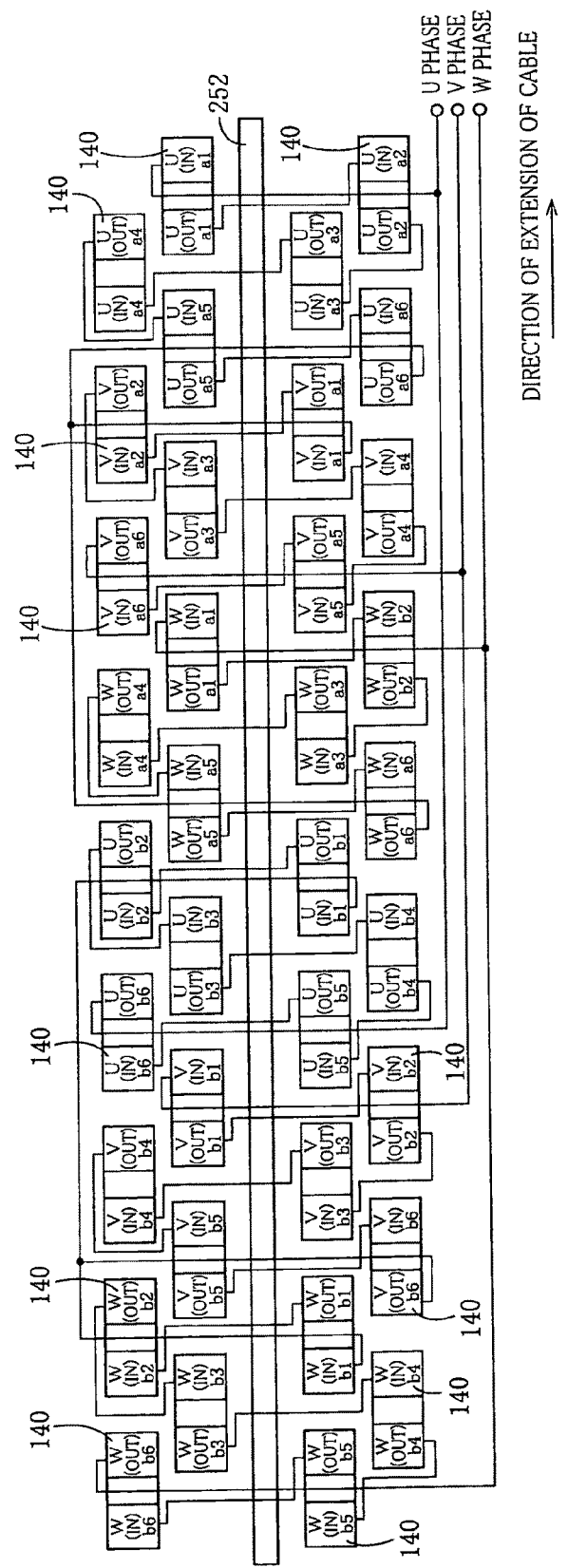

LINEAR MOTOR, LINEAR MOTOR SYSTEM, AND ELECTRONIC-CIRCUIT-COMPONENT MOUNTING MACHINE INCLUDING THE LINEAR MOTOR

CROSS REFERENCE TO RELATED APPLICATION

The present application claims the priority from Japanese Patent Application No. 2009-010319 filed Jan. 20, 2009, the disclosure of which is herein incorporated by reference in its entirety.

BACKGROUND OF THE INVENTION

Field of the Invention

The present invention relates in general to a linear motor, a linear motor system including the linear motor, and an electronic-circuit-component mounting machine including the linear motor, and more particularly to techniques for heat radiation from coils of the linear motor.

JP-2000-37070A and JP-2002-34230A disclose an example of a linear motor having an armature, and one row or two rows of permanent magnets which is/are moved relative to the armature. In the linear motor disclosed in JP-2000-37070A, two rows of permanent magnets are fixedly disposed such that the two rows are opposed to each other, and the armature is moved between the two rows of permanent magnets. The plurality of permanent magnets of each row are fixed on an elongate yoke such that the polarities of the adjacent permanent magnets alternately change, while the armature has a plurality of mutually independent core blocks, and a plurality of coils wound on the respective core blocks. The core blocks are arranged in one row in a direction of movement of the armature. The core blocks are attached to the back surfaces of respective movable members, and are connected together via the movable members. Each of the core blocks has two flanges at its respective opposite ends opposed to the respective two rows of permanent magnets, and one central fixing portion between the two flanges. The central fixing portion has a size larger than that of the flanges, in a direction parallel to the direction of arrangement of the core blocks. Two coils are wound on respective two portions of each core block between the central fixing portion and the two flanges. The adjacent core blocks are fixedly butted together through engagement of engaging projections and recesses, whereby the core blocks are positioned in the direction of opposition of the two rows of permanent magnets. Each core block is attached to the corresponding movable member at its central fixing portion, so that the core blocks provide two rows of cores on which the respective coils are wound and which are opposed to the respective two rows of permanent magnets. Flows of an electric current to the coils cause generation of a thrust force between each coil and the opposed permanent magnet, whereby the movable member is linearly moved along a straight line.

The linear motor disclosed in JP-2002-34230A has one row of fixed permanent magnets, and an armature is disposed in an opposed relationship with the row of permanent magnets such that the armature is linearly movable along a straight line parallel to the row of permanent magnets. The armature is constituted by a plurality of teeth of a comb-like body, which teeth are provided with respective cores on which respective coils are wound in a zigzag pattern. One of the two cores that are adjacent to each other in the direction of arrangement of the cores has the coil wound on its proximal end portion, while the other core has the coil wound on its distal end portion.

A supply of the electric current to each coil of the linear motor causes generation of heat, irrespective of whether the linear motor has two rows of permanent magnets or one row of permanent magnets. U.S. Pat. No. 6,005,310 discloses a linear motor having heat pipes for radiating the heat from the coils. Each of the heat pipes has one end portion fixed to the coil by a thermally conductive synthetic resin, and the other end portion fitted in a heat sink, so that the heat generated by the coil is conducted from the heat pipe to the heat sink, and externally dissipated to reduce a temperature rise of the coil.

SUMMARY OF THE INVENTION

The present invention was made in view of the background art described above. It is therefore an object of the present invention to provide a linear motor wherein the coils respectively wound on the plurality of cores are disposed in a zigzag pattern, and are provided with heat pipes for heat radiation. Another object of the invention is to provide a linear motor system including the linear motor described above. A further object of this invention is to provide an electronic-circuit-component mounting machine including the linear motor.

One of the objects indicated above can be achieved according to the principle of the present invention, which provides a linear motor including at least one permanent magnet row consisting of a plurality of permanent magnets fixed on an elongate yoke such that polarities of the permanent magnets alternately change, and an armature including a plurality of cores and a plurality of coils wound on the respective cores, wherein the at least one permanent magnet row and the armature are disposed adjacent to each other, and are moved relative to each other along a straight line by application of an electric current to the coils, and wherein each of the plurality of cores extends in a first direction perpendicular to the at least one permanent magnet row, and the plurality of cores are arranged in a second direction parallel to the straight line and perpendicular to the first direction, the plurality of coils being disposed on the plurality of cores such that the coils on the cores adjacent to each other in the second direction are arranged in a zigzag pattern and are spaced apart from each other in the first direction, with a gap left therebetween in the first direction, the armature further including a heat pipe having opposite end portions one of which is inserted in the gap and the other of which extends outwardly of the gap, the armature further including a plurality of fins fixed to the above-indicated other of the opposite end portions of the heat pipe.

Each permanent magnet row functions as a stator or a stationary member while the armature functions as a movable member. Alternatively, each permanent magnet row function as the movable member while the armature functions as the stator or Stationary member. The plurality of cores may be formed integrally with each other on a one-piece body, or may be a plurality of mutually independent core blocks.

The at least one permanent magnet row may be disposed so as to extend in the vertical direction or in the horizontal direction, or in a direction inclined with respect to the vertical and horizontal directions. Namely, the second direction may be either the vertical direction or the horizontal direction, or a direction inclined with respect to the vertical and horizontal directions. The armature is disposed so as to extend along the at least one permanent magnet row, that is, in the second direction.

In the linear motor constructed according to the present invention, the heat generated by the coils energized by an electric current supplied thereto is conducted by each heat pipe, then conducted to the plurality of fins, and radiated from the fins. The heat conducted to the heat pipes is effectively radiated from the plurality of fins having a large total heat radiating surface area, so that the coils can be efficiently cooled. Each of the heat pipes is inserted at its one end portion in the gap formed in the first direction between the coils of the cores that are adjacent to each other in the second direction, so that the heat is conducted to each one of the heat pipes from the two adjacent coils on the two adjacent cores, so that the heat can be evenly and efficiently radiated from the coils. Accordingly, the heat pipes effectively prevent a temperature rise of the coils of the armature, and make it possible to reduce the required number of windings of each coil for reducing the size and weight of the armature by increasing an amount of supply of the electric current to the coil while ensuring the required thrust force for the relative movement of the armature and the at least one permanent magnet row, or to increase the thrust force without changing the number of windings of each coil and without increasing the size and weight of the armature. Further, the provision of one heat pipe for the two adjacent coils permits economical reduction of the size and weight of the armature. In addition, the improvement in the heat radiating efficiency owing to the heat pipes fixed to the armature results in reduction of an amount of heat conducted to the other members connected to the armature, and consequent reduction of positioning accuracy of movable members moved by the present linear motor.

Some preferred modes of this invention will be described for illustrative purpose only. These modes of the invention are numbered like the appended claims, and each of the modes depends from the other mode or modes, where appropriate, for easier understanding of technical features disclosed in the present application, and possible combinations of those features. However, it is to be understood that the present invention is not limited to those technical features or combinations thereof, and that any one of a plurality of technical features described below with respect to any one mode of the invention may be a subject of the present invention, without the other technical feature or features being combined with that one feature.

(1) A linear motor including at least one permanent magnet row consisting of a plurality of permanent magnets fixed on an elongate yoke such that polarities of the permanent magnets alternately change, and an armature having a plurality of cores and a plurality of coils wound on the respective cores, wherein the at least one permanent magnet row and the armature are disposed adjacent to each other, and are moved relative to each other along a straight line by application of an electric current to the coils, the linear motor being characterized in that:

each of the plurality of cores extends in a first direction perpendicular to the at least one permanent magnet row, and the plurality of cores are arranged in a second direction parallel to the straight line and perpendicular to the first direction, the plurality of coils being disposed on the plurality of cores such that the coils on the cores adjacent to each other in the second direction are arranged in a zigzag pattern and are spaced apart from each other in the first direction, with a gap left therebetween in the first direction, and wherein the armature includes a heat pipe having opposite end portions one of which is inserted in the gap and the other of which extends outwardly of the gap, the armature further including a plurality of fins fixed to the above-indicated other of the opposite end portions of the heat pipe.

(2) The linear motor according to the above-described mode (1), wherein the at least one permanent magnet row consists of two permanent magnet rows opposed to each other in the first direction, and the plurality of cores consist of two parallel arrays of cores which correspond to the two permanent magnet rows, each of the cores of each of the two parallel arrays extending in the first direction, and wherein the coils wound on the cores of each of the two parallel arrays are arranged in the zigzag pattern such that the gap in which the above-indicated one end portion of the heat pipe is inserted is formed in the first direction between the coils wound on the cores adjacent to each other in the second direction.

In the linear motor according to the above-described mode (2) of this invention, the coils wound on the cores of each of the two parallel arrays corresponding to the respective two permanent magnet rows are arranged in the zigzag pattern, so that the required number of windings of each coil can be made smaller for more efficient radiation of the heat from the coil through the corresponding heat pipe, than in a linear motor wherein the coils on one of the two parallel arrays of cores cooperate with the coils on the other array of cores to form the zigzag pattern.

(3) The linear motor according to the above-described mode (1) or (2), wherein the plurality of cores are provided by a plurality of mutually independent core blocks, and the armature further includes a fixing device by which the plurality of mutually independent core blocks are fixed together.

Where the cores are provided by the mutually independent core blocks, the coils can be wound on the cores before the cores are fixed together, that is, without an interference between the two adjacent cores during an operation of winding of the coils on the adjacent cores. In addition, the coils can be wound on the cores while the core blocks are placed in an attitude suitable for winding of the coils on the cores. Thus, the use of the mutually independent core blocks facilitates the winding of the coils on the cores and permits an increase in the ratio of an area on each core block in which the coils are wound, with respect to an area on each core block in which the coils can be wound. The areas indicated are surface areas in transverse cross section of each core block taken in a plane parallel to the first direction in which each core block extends.

The plurality of mutually independent core blocks may be fixed together either mechanically or by bonding with suitable bonding means such as a bonding agent, for example.

Where the two permanent magnet rows are disposed on the opposite sides of the armature and are spaced apart from each other in the first direction, the fixing device cannot be provided on either one of the opposite sides of the armature as viewed in the first direction. Where the coils are wound on the adjacent core blocks in the zigzag pattern, each core block has a non-coil-winding portion on which the coils are not wound and which can be used for fixing the core blocks together by the fixing device, so that the size in the first direction and weight of the core blocks can be reduced, as compared with those of core blocks each which is provided with an exclusive fixing portion at which the core blocks are fixed together by the fixing device. In this respect, the zigzag arrangement of the coils is adequately employed in the linear motor having the two permanent magnet rows which are opposed to each other in the first direction. This aspect applies to the linear motor according to the mode (4) of this invention which will be described.

(4) The linear motor according to the above-described mode (1), wherein the at least one permanent magnet row consists of two permanent magnet rows opposed to each other in the first direction, and the plurality of cores are provided by a plurality of mutually independent core blocks each of which has opposite ends opposed to each of the two permanent magnet rows in the first direction, and the armature further includes a fixing device by which the plurality of mutually independent core blocks are fixed together, and wherein the coil wound on a portion of each of the plurality of core blocks which is opposed to one of the two permanent magnet rows and the coil wound on a portion of each of the plurality of core blocks which is opposed to the other of the two permanent magnet rows are arranged in the zigzag pattern such that the gap is formed in the first direction between the coils wound on the cores adjacent to each other in the second direction, and the one end portion of the heat pipe is inserted in the gap.

The two coils are wound on the respective two adjacent core blocks such that one of the two coils is wound on the portion of one of the two adjacent core block that is opposed to one of the two permanent magnet rows, while the other of the two coils is wound on the portion of the other core block opposed to the other permanent magnet row. The coils thus wound on the core blocks are arranged in the second direction in the zigzag pattern between the two permanent magnet rows. The heat generated by the two coils wound on the two adjacent core blocks is radiated by one heat pipe and the fins fixed to the heat pipe. Namely, one of the opposite end portions of the heat pipe is inserted in the gap formed between the coils on the respective portions of the two adjacent core blocks which are opposed to the respective two permanent magnet rows.

(5) The linear motor according to the above-described mode (3) or (4), wherein each of the plurality of core blocks takes the form of a generally rectangular plate including two flanges formed at respective opposite ends thereof, and the armature further includes a plurality of spacers each interposed between central portions in the first direction of adjacent ones of the plurality of core blocks arranged in the second direction, the spacers being formed of an aluminum alloy material.

A spacing interval between the adjacent core blocks in the second direction is determined by the plurality of spacers, so as to avoid an contact between the flanges of the adjacent core blocks. The provision of the spacers eliminates a need of providing each core block with a positioning portion for positioning the adjacent core blocks with the predetermined spacing pitch, resulting in reduction of the weight of each core block. The aluminum alloy material of the core blocks has a lower specific gravity than the above-indicated positioning portion of the core block formed of a ferromagnetic material, so that the weight of the armature can be reduced although the armature includes the spacers. It is also noted that a magnetic flux is formed so as to pass only the core blocks and permanent magnets, in the presence of the spacers formed of the aluminum alloy material which is a non-magnetic material not forming a magnetic path.

(6) The linear motor according to any one of the above-descried modes (3)-(5), wherein each of the plurality of core blocks takes the form of a generally rectangular plate including two flanges formed at respective opposite ends thereof and having a through hole formed therethrough in a third direction perpendicular to the first and second directions, and the fixing device includes two beam members disposed on respective end faces of the core blocks that are opposed to each other in the third direction, and fastening members inserted through the through holes of the core blocks to connect the two beam members to each other and to force the two beam members against the respective end faces of the core blocks, for fixing the core blocks together.

The fastening members are preferably formed of a ferromagnetic material, and preferably have a radial clearance of not larger than 0.1 mm, desirably, not larger than 0.05 mm, and more desirably not larger than 0.025 mm, with respect to the through holes, to enable the fastening members to function as a part of the magnetic path, to prevent a local increase of the magnetic flux density in the neighborhood of the through holes, which increase would otherwise be caused in the presence of the through holes. Where the above-described spacers formed of the aluminum alloy material are not provided between the adjacent core blocks, it is preferable that through holes formed through the two beam members have a high degree of accuracy in their diameter and positions, so that the fixing device can function as a positioning device for positioning the plurality of core blocks relative to each other. The fastening members may be screws, bolts or rivets, for example.

The through hole may be formed through a non-coil-winding portion of each core block on which the coil is not wound, or through an exclusive fixing portion of each core block which is provided exclusively for the purpose of receiving the through hole. The core block having the through hole formed through the non-coil-winding portion can be small-sized as compared with that having the through hole formed through the exclusive fixing portion.

(7) The linear motor according to the above-described mode (5), wherein each of the plurality of spacers constitutes the above-indicated one of the opposite end portions of the heat pipe.

Each of the spacers can function as the end portion of the heat pipe inserted in the above-described gap. In this case, the armature can be made small-sized and compact.

(8) The linear motor according to claim 5, wherein each of the plurality of spacers has a hole in which the above-indicated one of the opposite end portions of the heat pipe is inserted.

The hole formed through each spacer can be utilized as a space in which the above-described one end portion of the heat pipe is inserted. In this case, the armature can be made small-sized and compact.

(9) The linear motor according to any one of the above-descried modes (5), (7) and (8), wherein the fixing device includes two beam members disposed on respective end faces of the core blocks that are opposed to each other in a third direction perpendicular to the first and second directions, and each of the plurality of spacers connects the two beam members to each other and to force the two beam members against the respective end faces of the core blocks, for fixing the core blocks together.

In the linear motor according to the above-described mode (9), the spacers function as fastening members to connect the two beam members to each other for fixing the core blocks together. Accordingly, the core blocks need not have through holes through for the fastening members to fix the core blocks together, so that the armature produces a magnetic field such that each core block as a whole is evenly subjected to lines of magnetic forces.

(10) The linear motor according to any one of the above-descried modes (1)-(9), further comprising a covering member which covers the plurality of fins fixed to the plurality of heat pipes and which cooperates with the armature to define an air flow passage, and at least one fan disposed in at least one of opposite end portions of the air flow passage extending in the second direction, to generate a flow of air through the air flow passage.

Heat conducted through the heat pipes to the heat radiating fins is efficiently dissipated by the air flow generated by the at least one fan in the air flow passage. Thus, the heat radiation by the heat pipes and fins is promoted by the air flow generated by the at least one fan. Where the armature functions as the movable member, the air flow remains to exist in the neighborhood of the heat radiating fins, to continue the efficient heat radiation even while the armature is held stationary.

(11) The linear motor according to any one of the above-described modes (1)-(10), wherein each of the plurality of cores has a bobbin on which the coil is wound and which includes a sleeve portion, and a pair of outward flanges outwardly extending in the second direction from respective two positions of the sleeve portion which are located between one of opposite ends and a central position of the sleeve portion as viewed in the first direction, and wherein adjacent ones of the plurality of cores are oriented in opposite directions in the first direction with 180° rotation with respect to each other so that the coils wound between the pair of outward flanges of the bobbins of the adjacent cores are arranged in the zigzag pattern in the second direction, the gap in which the one end portion of the heat pipe is inserted being formed in the first direction between an outer surface of one of the pair of outward flanges of one of the two adjacent cores and an outer surface of the corresponding one of the pair of outward flanges of the other of the two adjacent cores.

A portion of the sleeve portion of the bobbin which is other than the portion between the pair of outward flanges functions as a spacer portion that enables the coils wound between the outward flanges of the bobbins of the adjacent cores to be arranged in the zigzag pattern and to be spaced apart from each other in the first direction with the gap being left therebetween. Namely, the bobbin is considered to consist of the coil-winding portion and the spacer portion that are formed integrally with each other. Thus, the bobbins of the plurality of cores facilitate the zigzag arrangement of the coils.

(12) The linear motor according to any one of the above-described modes (1) through (11), wherein each of the plurality of cores has a bobbin having a rectangular shape in transverse cross section, the bobbin including a square sleeve portion on which the coil is wound and which is formed of a non-electrically-conductive material, and a pair of outward flanges outwardly extending in the second direction from respective two positions of the square sleeve portion which are spaced from each other in the first direction, each of at least one of the pair of outward flanges having, in an inner surface thereof opposed to an inner surface of the other outward flange, a groove which is contiguous with a side surface of the square sleeve portion and which extends to an outer edge of the inner surface, to guide a beginning end portion of a conductive wire of the coil from the outer edge of the inner surface to come into contact with the side surface of the square sleeve portion, and to permit the other portion of the conductive wire of the coil to be wound on the square sleeve portion.

In the absence of the groove in the inner surface of the outward flange of the bobbin on the side of the beginning end of the coil, it is difficult to wind the conductive wire on the square sleeve portion of the bobbin to form the coil such that the beginning end portion is held in close contact with the inner surface of the outward flange of the bobbin. In other words, the groove formed in the inner surface of the outward flange of the bobbin accommodates the beginning end portion of the conductive wire so that the beginning end of the coil is in close contact with the inner surface of the outward flange, without a clearance between the outward flange and the coil.

The technical feature of the above-described mode (12) of this invention can be provided independently of the technical features of the above-described modes (1) through (11). For example, the pair of outward flanges may be located at the respective opposite ends of the square sleeve portion as viewed in the first direction, or at two positions between one of the opposite ends and a central position of the square sleeve.

(13) The linear motor according to any one of the above-described modes (1) through (12), wherein each of the plurality of cores has a bobbin having a rectangular shape in transverse cross section, the bobbin including a square sleeve portion on which the coil is wound, and a pair of outward flanges outwardly extending the second direction from respective two positions of the square sleeve portion which are spaced from each other in the first direction, and wherein the bobbin consists of two members formed of a non-electrically-conductive material and respectively having a first engaging portion and a second engaging portion, the two members being butted together in a third direction perpendicular to the first and second directions, with the first and second engaging portions being held in engagement with each other, to form the bobbin.

In the linear motor according to the above-described mode (13), the bobbin can be easily provided on each core, even where each core takes the form of a generally rectangular plate including two flanges formed at respective opposite ends thereof. The technical feature of the present mode (13) can be provided independently of the technical features of the modes (1)-(12).

(14) The linear motor according to any one of the above-descried modes (1)-(13), which is operated with an alternating current having three phases consisting of a U phase, a V phase and a W phase, and wherein all of the coils of each of the U, V and W phases which are wound on the cores adjacent to each other in the second direction are formed continuously of a single conductive wire.

In the linear motor according to the above-described mode (14), the number of connections of the conductive wires of the coils is reduced, so that the operation to connect the conductive wires is simplified, leading to an accordingly reduced cost of manufacture of the armature. In addition, the reduction of the number of the connections of the conductive wire results in an operating failure of the linear motor due to the defective connection of the conductive wires, and improved operating reliability of the linear motor. Further, the overall length of the conductive wires required to form the coils can be reduced, owing to the reduction of the number of the wire connections. The wording "all of the coils of each of the U, V and W phases which are wound on the cores adjacent to each other in the second direction are formed continuously of a single conductive wire" means that all of the above-indicated coils are formed of a conductive wire without a connecting portion. At the connecting portion, the two wires are either mechanically connected to each other by caulking, or crimping or compression bonding, or connected to each other by welding.

The technical feature of the above-described mode (14) of the invention can be provided independently of the technical features of the above-described modes (1) through (13).

(15) A linear motor system comprising:

a linear motor according to any one of the above-described modes (1)-(14) wherein the second direction is a horizontal direction; and a covering member which covers a space above the linear motor and which has at least one opening open upwards.

Air heated by the heat radiated from the fins, or the heated air flowing through the air flow passage is discharged or exhausted through the at least one opening formed through the covering member. The technical feature of the above-described mode (15) of the invention can be provided independently of the technical features of the above-described modes (1) through (14).

(16) The linear motor system according to the above-described mode (15), further comprising at least one exhaust fan each exhaust in a corresponding one of the at least opening of the covering member, to discharge air upwardly from the space within the covering member.

The heated air can be positively discharged out of the space covered by the covering member, so that the coils can be efficiently cooled.

(17) An electronic-circuit-component mounting machine comprising:

a component supply device configured to supply electronic circuit components;

a board holding device configured to hold a circuit board;

a holder head configured to hold the electronic circuit component; and a head moving device configured to move the holder head to a desired position in a plane parallel to the circuit board as held by the board holding device, wherein the holder head receives the electronic circuit component from the component supply device and mounts the electronic circuit component on the circuit board held by the board holding device, and wherein the head moving device includes a linear motor according to any one of the above-described modes (1)-(14).

In the electronic-circuit-component mounting machine constructed according to the above-described mode (17) of this invention, the heat generated by the coils of the linear motor can be efficiently radiated, so that the amount of heat conducted from the linear motor to the components of the head moving device can be effectively reduced, whereby an amount of thermal deformation of those components is effectively reduced to minimize a degree of deterioration of operating accuracy of the electronic-circuit-component mounting machine.

(18) The electronic-circuit-component mounting machine according to the above-described mode (17), further comprising a covering member which covers a space above the linear motor and which has at least one opening open upwards.

The electronic-circuit-component mounting machine according to the above-described mode (18) of the invention has substantially the same advantage as described above with respect to the mode (15) of this invention.

(19) The electronic-circuit-component mounting machine according to the above-described mode (17) or (18), further comprising at least one exhaust fan each exhaust in a corresponding one of the at least opening of the covering member, to discharge air upwardly from the space within the covering member.

The electronic-circuit-component mounting machine according to the above-described mode (18) of the invention has substantially the same advantage as described above with respect to the mode (16) of this invention.

BRIEF DESCRIPTION OF THE DRAWINGS

The above and other objects, features, advantages and technical and industrial significance of the present invention will be better understood by reading the following detailed description of preferred embodiments of the present invention, when considered in connection with the accompanying drawings, in which:

FIG. 19 is a view for explaining an order of winding of the coils and connection of the coils on the core blocks of the armature shown in FIG. 4;

DETAILED DESCRIPTION OF THE PREFERRED EMBODIMENTS

Some preferred embodiments of this invention will be described in detail by reference to the accompanying drawings. It is to be understood that the present invention can be embodied with various changes and modifications other than the following embodiments and the various modes described above in the SUMMARY OF THE INVENTION, which may occur to those skilled in the art.

Figure 1:
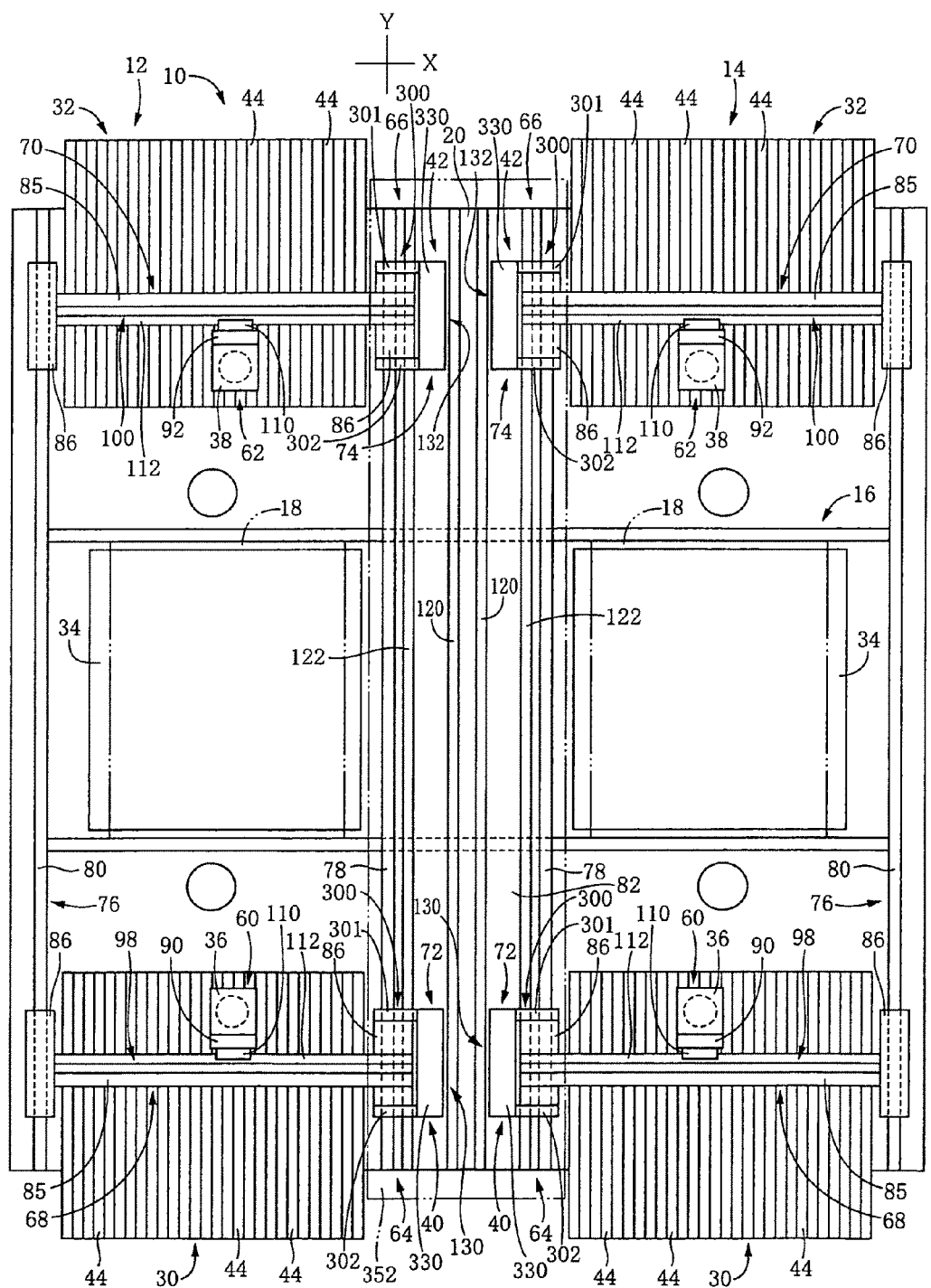
FIG. 1 is a plan view schematically showing an electronic-circuit-component mounting machine equipped with linear motors constructed according to one embodiment of this invention.

Referring first to FIG. 1, there is schematically shown an electronic-circuit-component mounting machine including a linear motor system constructed according to one embodiment of this invention. The present electronic-circuit-component mounting machine is provided with a main body portion 10, and a pair of electronic-circuit-component mounting portions 12, 14. These electronic-circuit-component mounting portions 12, 14 are disposed symmetrically with each other with respect to a straight line perpendicular to a direction of feeding of circuit boards 18 by a board conveyor device 16, in a plane parallel to a component mounting surface of each circuit board 18, namely, in the horizontal plane in the present electronic-circuit-component mounting machine. That is, the two electronic-circuit-component mounting portions 12, 14 are arranged side by side in the direction of feeding of the circuit boards 18 by the board conveyor device 16. The direction of feeding of the circuit boards 18 will be referred to as "an X-axis direction (first direction)", while the direction perpendicular to the direction of feeding of the circuit board 18 in the horizontal plane will be referred to as "a Y-axis direction (second direction)". The board conveyor device 16 is a conveyor in the form of a belt conveyor, which extends over a base 20 of the main body portion 10, between the two electronic-circuit-component mounting portions 12, 14.

Since the electronic-circuit-component mounting portions 12, are identical in construction with each other, only the electronic-circuit-component mounting portion 14 disposed on the downstream side as seen in the direction of feeding of the circuit board 16 will be described by way of example.

As shown in FIG. 1, the electronic-circuit-component mounting portion 14 includes a pair of component supply devices 30, 32, a board holding device 34, a pair of holding heads 36, 38, and a pair of head moving devices 40, 42. The two component supply devices 30, 32 are disposed on respective opposite sides of the board conveyor device 16 as seen in the Y-axis direction. Each of the component supply devices 30, 32 includes a plurality of component supply devices in the form of component feeders 44 mounted on a feeder support station to supply electronic circuit components. For instance, each component feeder 44 is a tape feeder arranged to feed a tape which accommodates the electronic circuit components arranged in a predetermined pitch in its direction of feeding. The component feeders 44 are disposed such that component supply portions of the component feeders 44 are arranged in the direction of feeding of the circuit boards 18 by the board conveyor device 16. The component feeder 44 may be a bulk feeder, a stick feeder or any other type of feeder other than the tape feeder described above. The component supply devices 30, 32 may be replaced by any other type of component supply device, for instance, a device including a component tray from which electronic circuit components are supplied, or a combination of component feeders and a component tray. For example, the board holding device 34 includes a support station provided with support members in the form of support pins removably attached to its support surface to support the circuit board 18 on its lower surface, and a clamping device arranged to clamp the circuit board 18 at its opposite edges parallel to its direction of feeding. The support members in the form of support pins may be provided with vacuum cups to hold the circuit board 18 by suction, against the support surface of the support station.

The holder heads 36, 38 and the head moving devices 40, 42 will be described. The head moving devices 40, 42 include respective X-axis drive devices 60, 62 and respective Y-axis drive devices 64, 66. The Y-axis drive devices 64, 66 include respective Y-axis slides 68, 70 and respective movable-member drive devices in the form of linear motors 72, 74. The Y-axis slide 68, 70 are guided by a common guide device 76.

Figure 2:
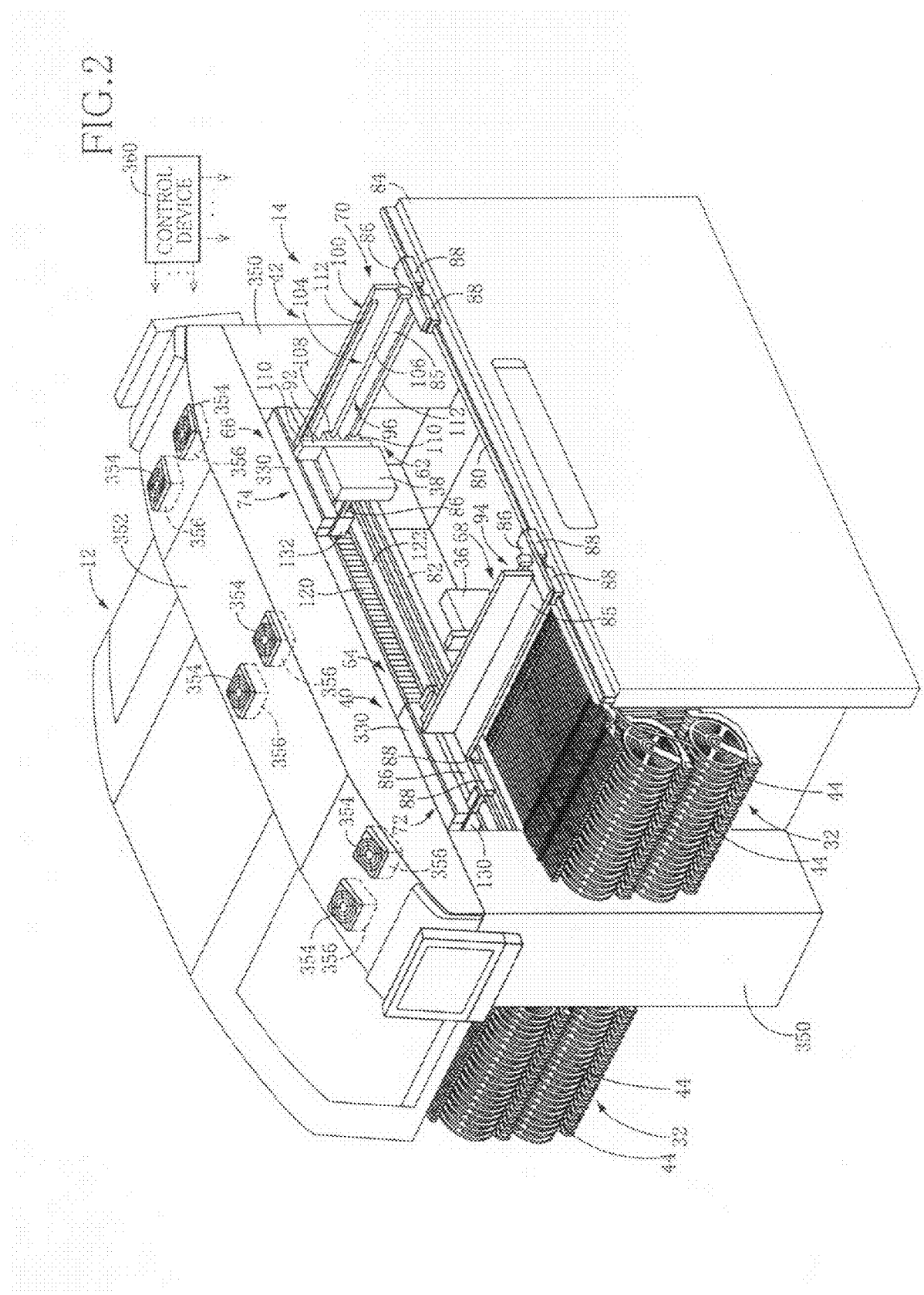
FIG. 2 is a perspective view of the electronic-circuit-component mounting machine of FIG. 1.

As shown in FIGS. 1 and 2, the guide device 76 includes guide members in the form of guide rails 78, 80 which extend in the Y-axis direction and which are respectively disposed at central and right-hand side end portion of the above-indicated base 20 as seen in the X-axis direction. The right-hand side end portion of the base 20 in which the guide rail 80 is disposed is spaced from the central portion toward the downstream end as seen in the direction of feeding of the circuit board 18. The guide rail 78 is disposed on a mounting block 82 provided on the above-indicated central portion of the base 20, while the guide rail 80 is disposed on a side wall portion 84.

As shown in FIG. 1, each of the Y-axis slides 68, 70 includes an elongate main body portion 85 having two leg portions 86 at respective longitudinally opposite ends, and guided members in the form of two guide blocks 88, which are provided at each of the two leg portions 86, as shown in FIG. 2. The guide blocks 88 are held in sliding engagement with the guide rails 78, 80 so that the guide blocks 88 are slidably movable in the Y-axis direction. The Y-axis slides 68, 70 have respective areas of movement which overlap each other over a considerably long distance, and the guide device 76 constitutes parts of the Y-axis drive devices 64, 66. The linear motors 72, 74 will be described later in detail.

Figure 25:
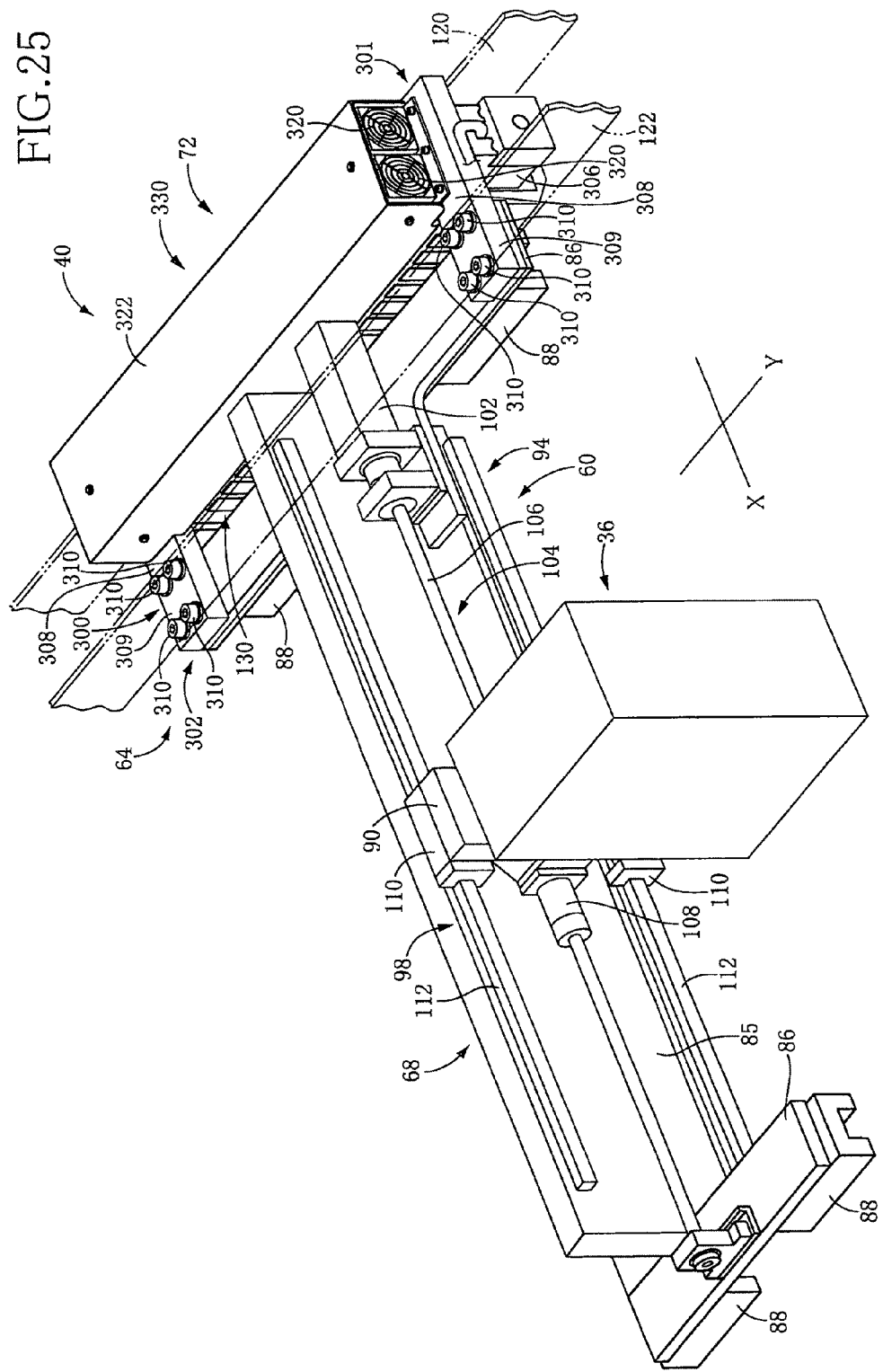
FIG. 25 is a perspective view showing a Y-axis slide connected to the armature shown in FIG. 24.

As shown in FIGS. 1 and 2, the X-axis drive devices 60, 62 are disposed on the respective Y-axis slides 68, 70, and respectively include movable members in the form of X-axis slides 90, 92, X-axis-slide drive devices 94, 96, and guide devices 98, 100. As shown in FIG. 25, the X-axis-slide drive device 94 includes as a drive source a rotary electric motor in the form of an X-axis drive motor 102, and further includes as a motion converting mechanism a feed screw mechanism in the form of a ball screw mechanism 104. The X-axis drive motor 102 is a rotary electric motor in the form of a servomotor the angle of rotation of which can be accurately controlled. The ball screw mechanism 104 includes a ball screw 106 which is disposed on the Y-axis slide 68 so as to extend in the X-axis direction and which is rotated by the X-axis drive motor 102, and a ball nut 108 which is disposed on the X-axis slide 90 and which is held in engagement with the ball screw 106. As also shown in FIG. 25, the X-axis slide 90 is provided with a guide block 110 and is guided by the guide device 98 including a pair of guide rails 112, so that the X-axis slide 90 is movable on the Y-axis slide 68 in the X-axis direction. The X-axis-slide drive device 96 and the guide device 100 are identical in construction with the Y-axis-slide drive device 94 and the guide device 98, respectively. The X-axis slide 92 is movable on the Y-axis slide 70 in the X-axis direction.

As shown in FIG. 1, the holder heads 36, 38 are respectively disposed on the X-axis slides 90, 92, and are moved in the Y-axis direction from the respective component supply devices 30, 32 to desired positions in an area in which the board holding device 34 is located as seen in the horizontal plane. Each of the holder heads 36, 38 is provided with a component holding device in the form of at least one suction nozzle (not shown) arranged to pick up an electronic circuit component by suction from the selected component feeder 44, and to mount the electronic circuit component on the circuit board 18.

The linear motors 72, 74 will be described. As shown in FIG. 1, two permanent magnet rows 120, 122 are disposed on the above-described mounting block 82 adjacent the guide rail 78 in the central portion of the base 20 as seen in the X-axis direction, such that the permanent magnet rows 120, 122 extend in the Y-axis direction and are spaced apart from each other and opposed to each other in the X-axis direction. The guide rail 78 and the permanent magnet rows 120, 122 are fixed to the mounting block 82 and positioned in place in the X-axis and Y-axis directions. Each of the Y-axis slides 68, 70 as a whole may be considered as a movable member, or the pair of leg portions 86 or the pair of guide blocks 88 provided on the leg portions 86 may be considered as a movable member. In this case, it is considered that the movable member is guided by the guide rails 78, 80, and the mounting block 82, side wall portion 84 and base 20 constitute a major part of a holding member which positions and holds the permanent magnet rows 120, 122 and the guide rails 78,80. Where the leg portions 86 guided by the guide rail 78, or the guide blocks 88 provided on the leg portions 86 are considered to constitute the movable member, the mounting block 82 is considered to constitute the holding member.

Figure 3:
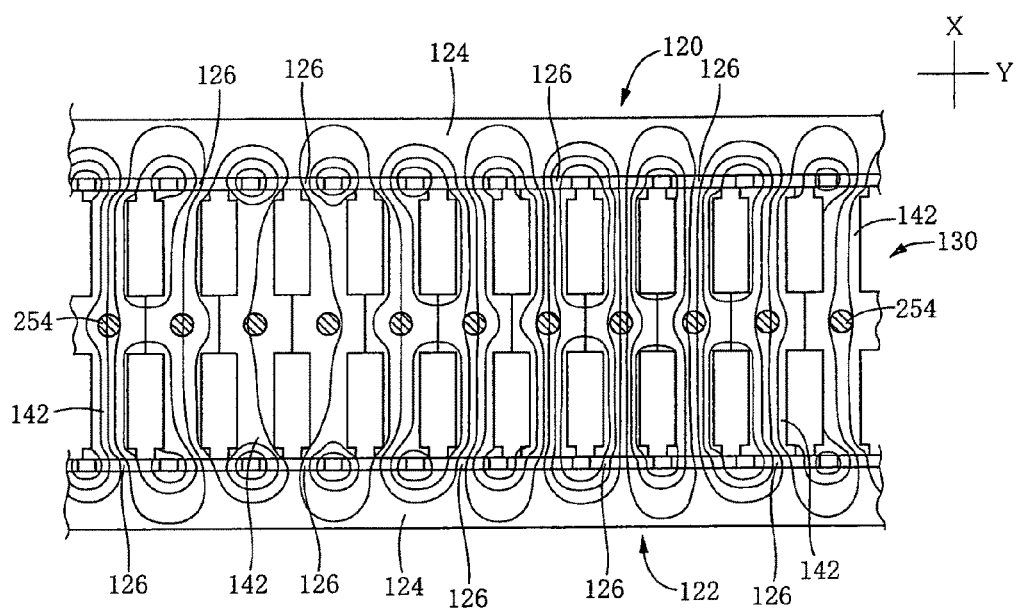
FIG. 3 is a plan view partly in cross section showing a portion of each of two rows of permanent magnets and some core blocks of an armature, in the linear motor of FIG. 1.

As shown in FIG. 3, each of the two permanent magnet rows 120, 122 includes a yoke 124, and a plurality of permanent magnets 126 fixed to the yoke 124. The yoke 124 is an elongate member which is fixed to the mounting block 82 such that the longitudinal direction of the elongate member is parallel to the Y-axis direction. The two yokes 124 of the two permanent magnet rows 120, 122 have respective surfaces opposed to each other. As also shown in FIG. 3, the permanent magnets 126 of the two rows 120, 122 are fixed to the opposed surfaces of the yokes 124 such that the permanent magnets 126 of each row 120, 122 are equally spaced from each other in a predetermined spacing pitch in the longitudinal direction of the yokes 124 and such that the polarities of the permanent magnets 126 alternately change in the longitudinal direction.

The two linear motors 72, 74 include respective armatures 130, 132 each of which is disposed between the two permanent magnet rows 120, 122, such that gaps of magnetic flux are left between the permanent magnet rows 120, 122 and such that each linear motor 72, 74 is movable in the Y-axis direction between the permanent magnet rows 120, 122. In the present linear motors 72, 74 having the two permanent magnet rows 120, 122 opposed to each other, these permanent magnet rows 120, 122 constitute a fixed member or stator while the armatures 130, 132 constitute a movable member. The armatures 130, 132 are disposed adjacent to the permanent magnet rows 120, 122, with the air gaps of magnetic flux being left between the armature 130, 132 and the cores of the armature 130, 132. An electromagnetic action between each armature 130, 132 and the permanent magnet rows 120, 122 causes generation of a thrust force which moves the Y-axis slide 68, 70. Each of the linear motors 72, 74 includes the two permanent magnet rows 120, 122, which are considered to function as the common stator for the two linear motors 72, 74. Since the two armatures 130, 132 are identical in construction with each other, only the armature 130 will be described by way of example.

Figure 4:
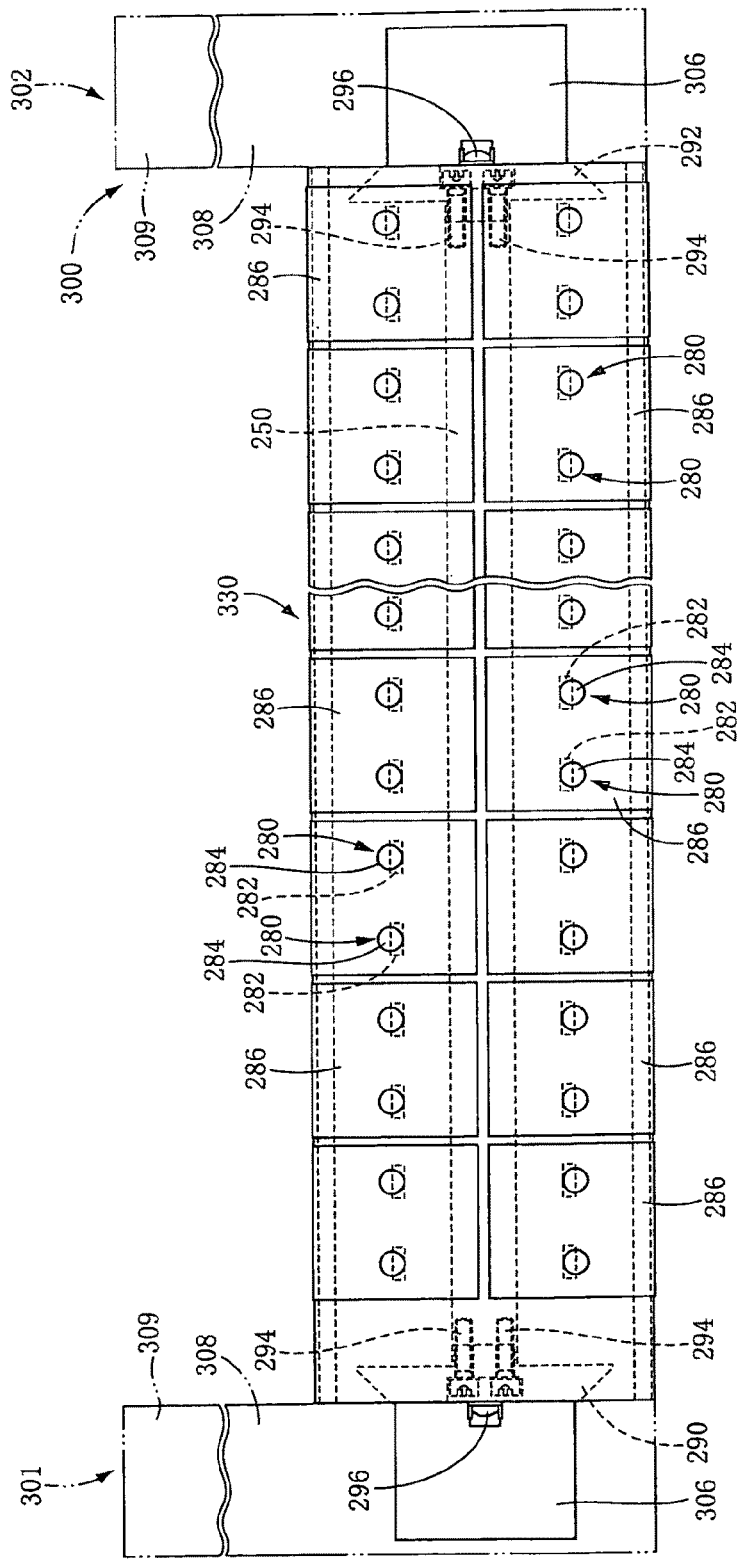
FIG. 4 is a plan view of the armature of the linear motor of FIG. 1.
Figure 5:
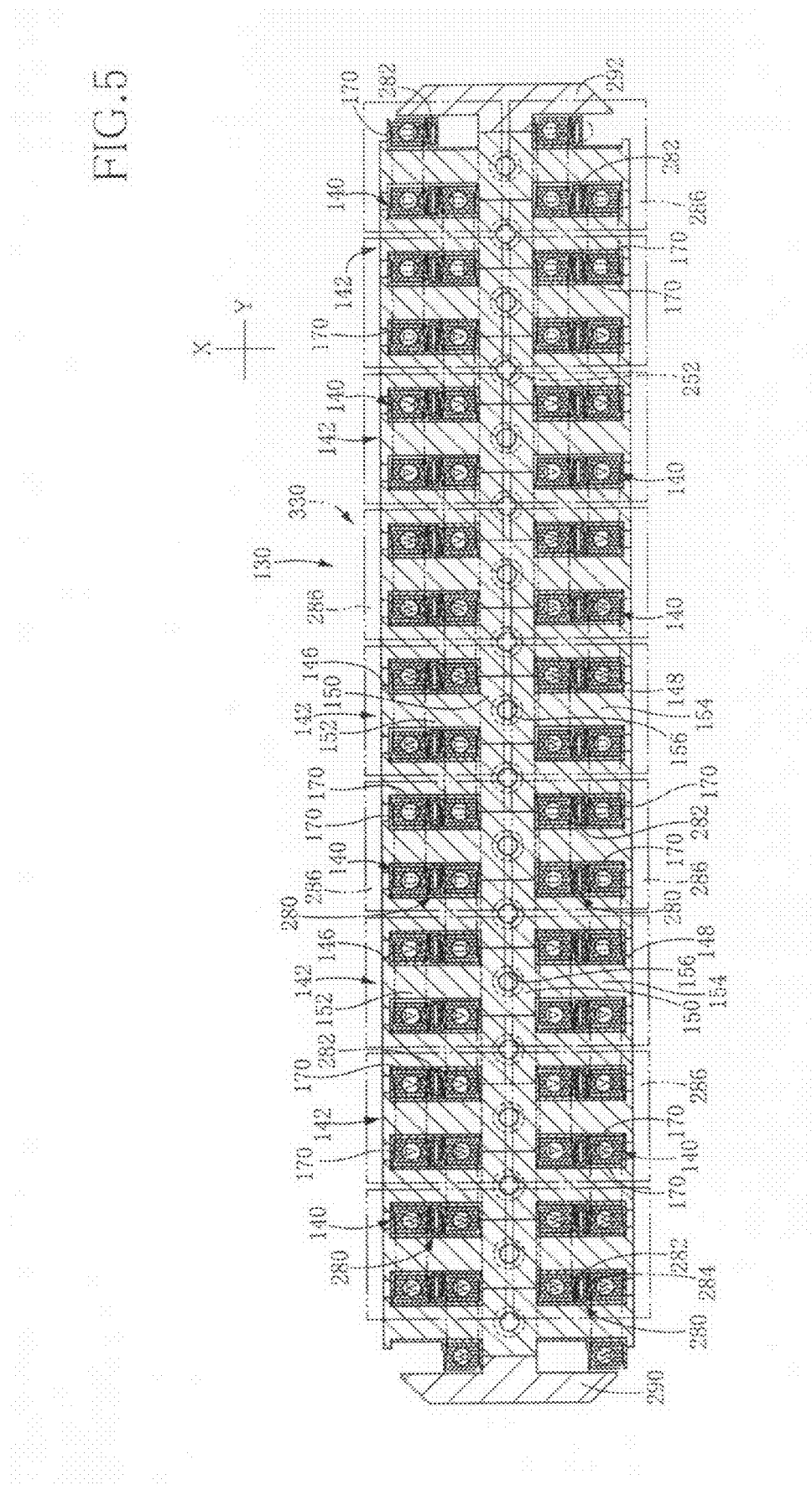
FIG. 5 is a plan view in cross section of the armature shown in FIG. 4.
Figure 6:
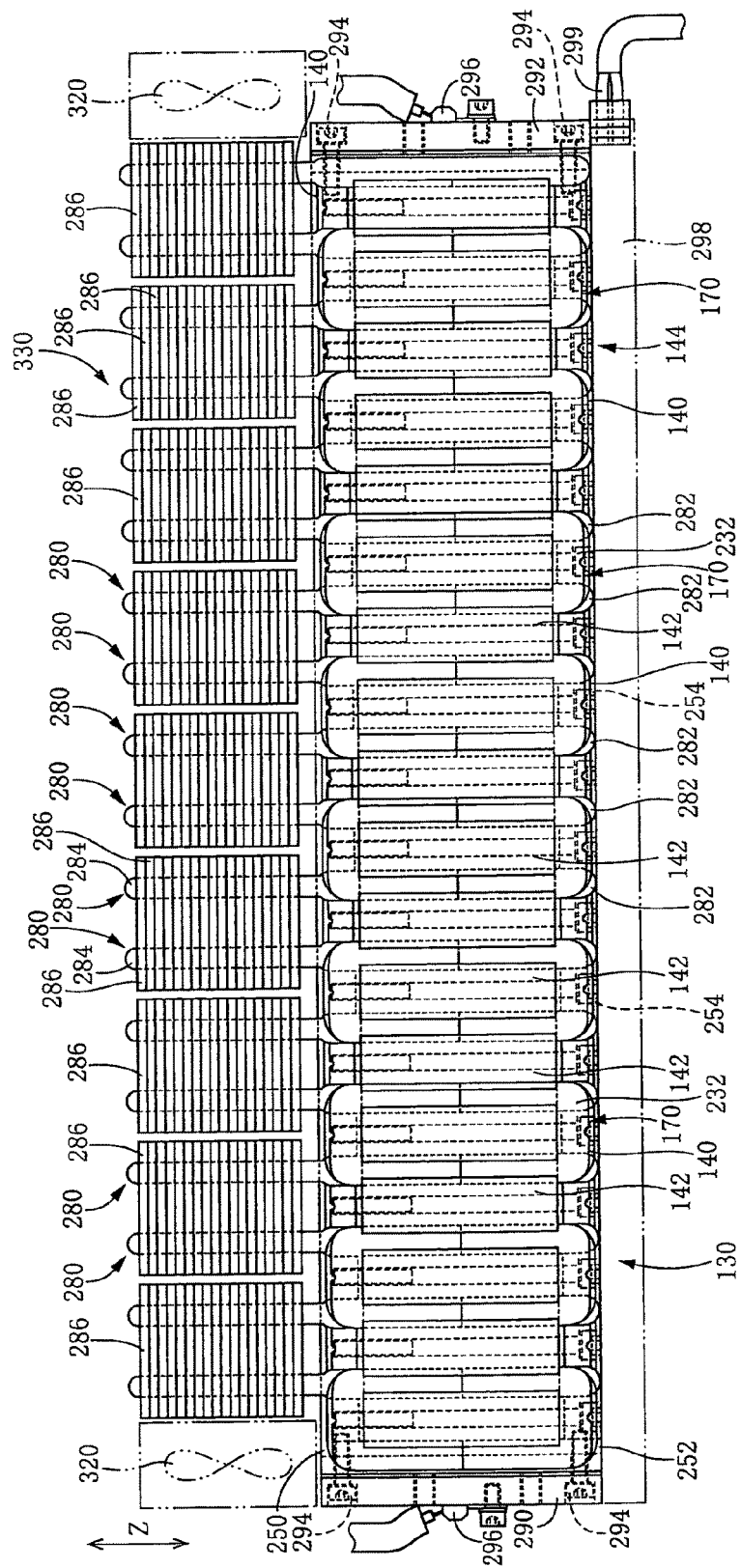
FIG. 6 is a side elevational view of the armature shown in FIG. 4.

As shown in FIGS. 4-6, the armature 130 includes a plurality of mutually independent core blocks 142 each of which provides two cores on which respective two coils 140 are wound. The core blocks 142 are connected together by a connecting device in the form of a fixing device 144 (which will be described in detail). Each of the core blocks 142 is formed of a ferromagnetic material such as silicon steel, for example. As shown in FIG. 3, each of the core blocks 142 of the armature 130 is disposed so as to extend in the direction in which the two permanent magnet rows 120, 122 are opposed to each other. Namely, each core block 142 extends in the direction perpendicular to the permanent magnet rows 120, 122. The plurality of core blocks 142 are arranged along a straight line parallel to the two permanent magnet rows 120, 122, that is, parallel to the direction of arrangement of the plurality of permanent magnets 126 in the two rows 120, 122, such that the core blocks 142 are fixed or connected together by the fixing device 144. The core blocks 142 are considered to consist of two parallel arrays of cores which correspond to the respective two permanent magnet rows 120, 122. Each of the cores of each array extends in the direction perpendicular to the permanent magnet rows 120, 122. In the linear motors 72, 74, the two permanent magnet rows 120, 122 are opposed to each other in the X-axis direction (first direction), while the core blocks 142 are arranged in the Y-axis direction (second direction). The X-axis direction and the Y-axis direction define the horizontal plane.

Figure 9:
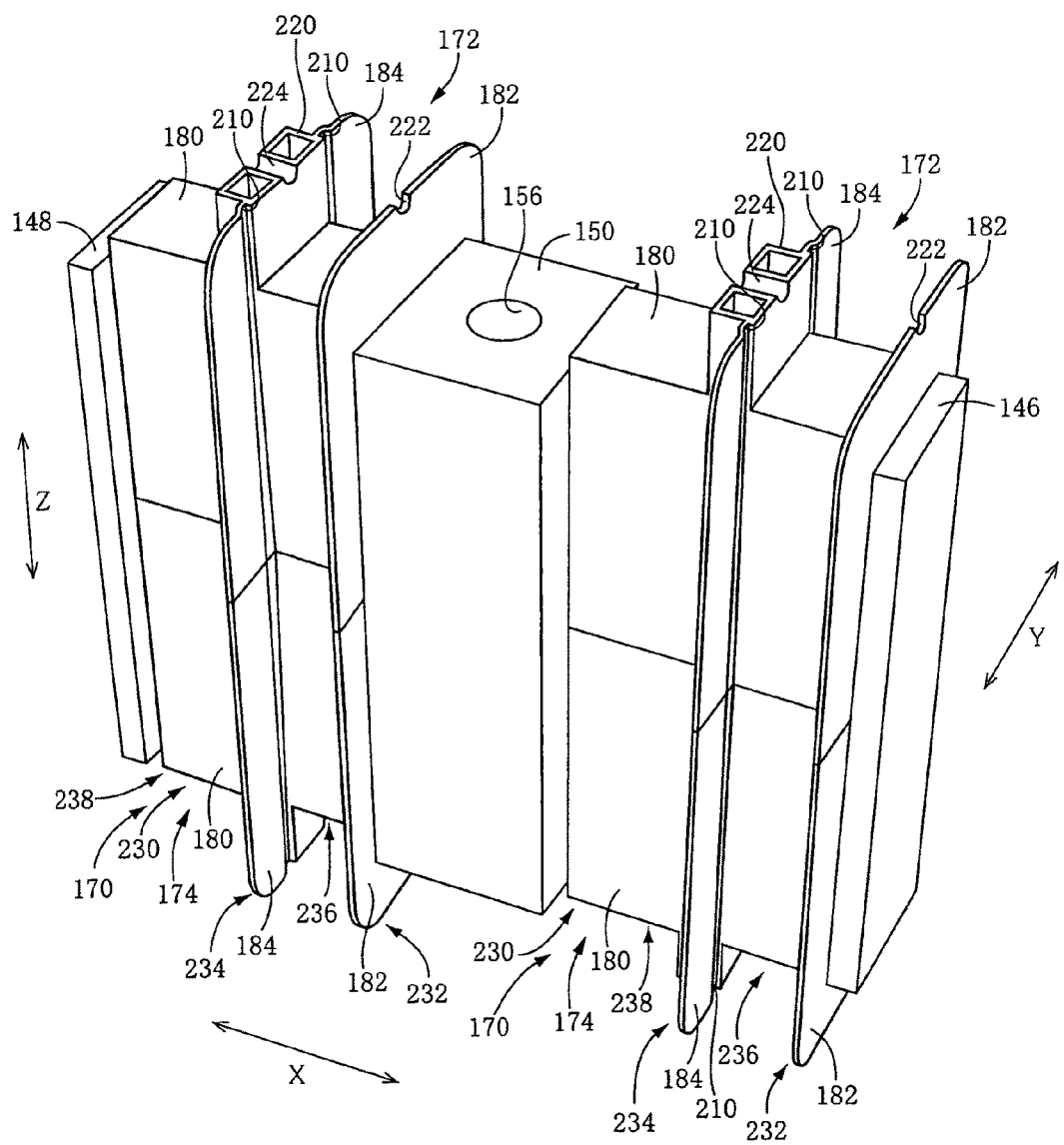
FIG. 9 is a perspective view showing bobbins provided on one core block of the armature shown in FIG. 4.

As shown in FIGS. 5 and 9, each of the core blocks 142 takes the form of a generally rectangular plate having a generally rectangular shape in cross section taken in a vertical plane perpendicular to the X-axis direction, and includes two flanges 146, 148 at the opposite ends of the rectangular plate as viewed in the X-axis direction, and a central fixing portion 150 located intermediate between the two flanges 146, 148. The central fixing portion 150 has a width (size in the Y-axis direction) larger than that of the flanges 146, 148. The core block 142 has two coil winding portions 152, 154 between the central fixing portion 150 and the respective two flanges 146, 148. The central fixing portion 150 has a through hole 156 formed therethrough so as to extend in the direction perpendicular to the X-axis and Y-axis directions. The through hole 156 has a circular shape in transverse cross section. In the linear motors 72, 74, the through hole 156 extends in the vertical direction (perpendicular to the X-axis and Y-axis directions). The vertical direction perpendicular to the X-axis and Y-axis directions is hereinafter referred to as "a Z-axis direction (third direction)".

As shown in FIGS. 5, 6 and 9, the two coil winding portions 152, 154 are provided with respective bobbins 170 on which the coils 140 are wound. These two bobbins 170 have the same construction.

Figure 10:
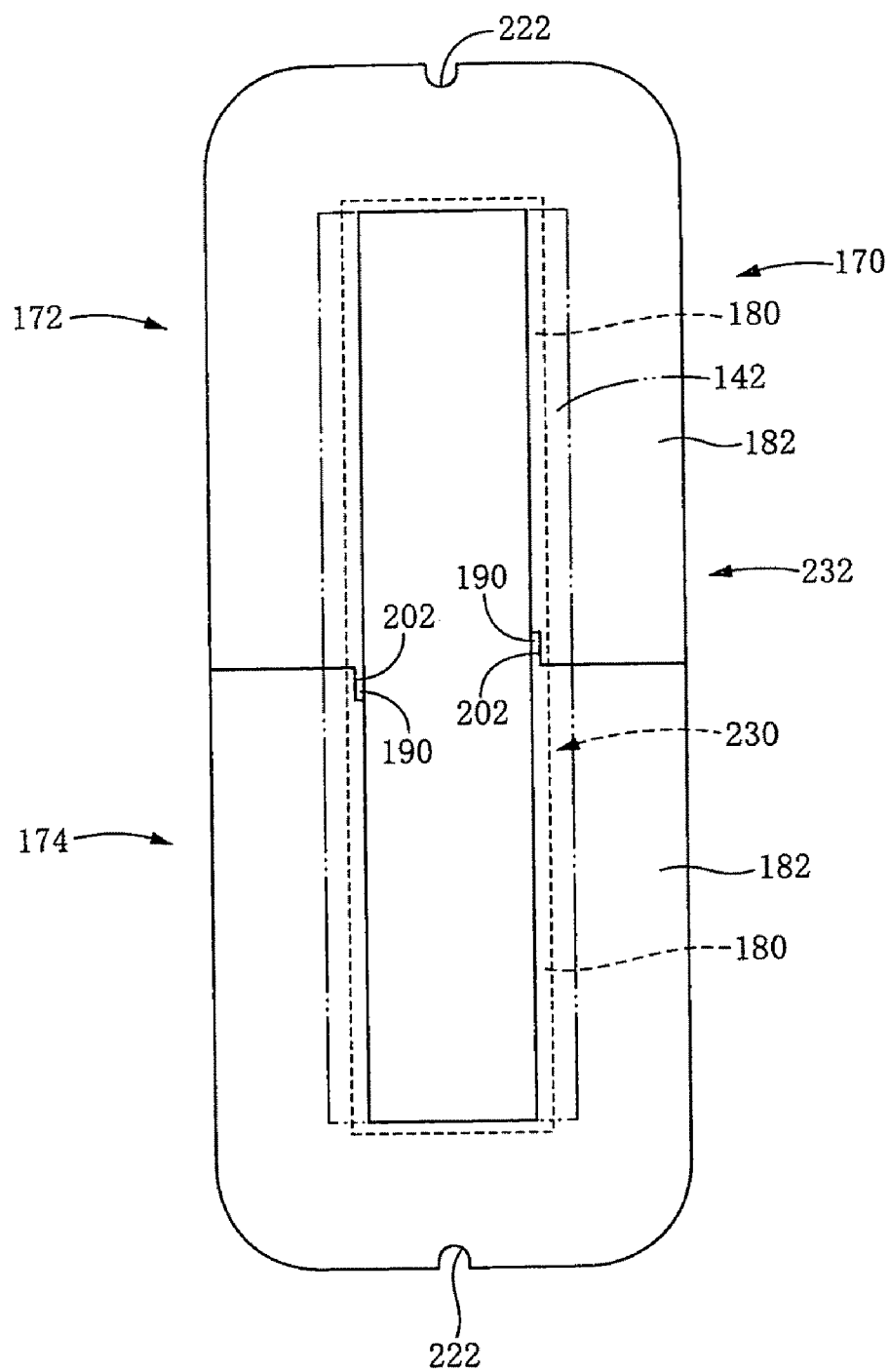
FIG. 10 is a side elevational view of one of the bobbins shown in FIG. 9.
Figure 11:
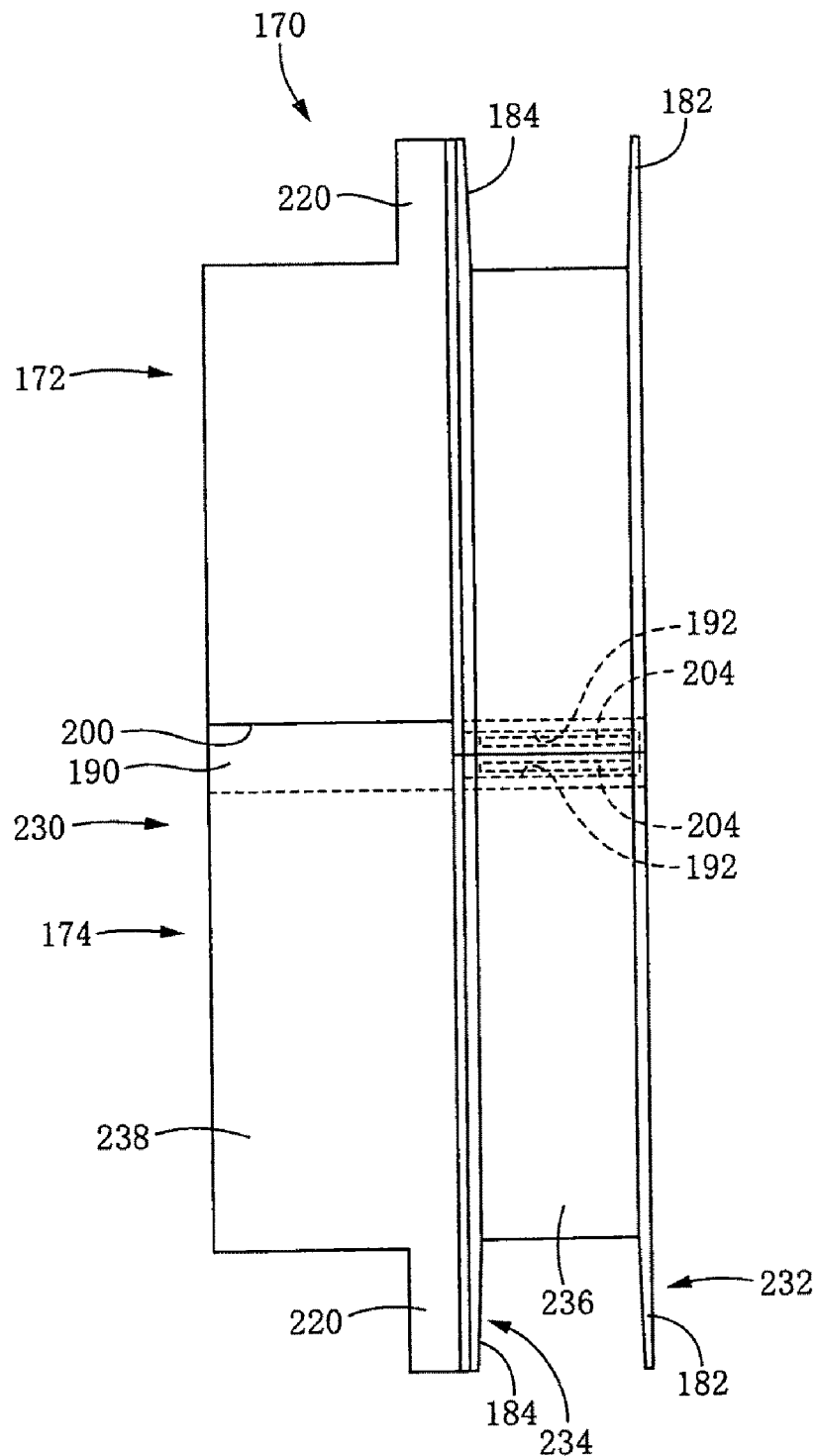
FIG. 11 is a front elevational view of the bobbin shown in FIG. 10.

As shown in FIGS. 10 and 11, each bobbin 170 is constituted by two bobbin forming members 172, 174 formed of a non-electrically-conductive material in the form of a synthetic resin such as a polyamide resin or any other fire-resistive synthetic resin. As shown in FIG. 10, the two bobbin forming members 172, 174 are two halves of the bobbin 170 of the core block 142, which are butted together in an X-Y plane parallel to the X-axis and Y-axis directions, at an intermediate position in the direction of extension of the through hole 156 (in the Z-axis or vertical direction perpendicular to the X-axis and Y-axis directions). Since the two bobbin forming members 172, 174 (two halves of the bobbin 170) have the same shape and dimensions, only the bobbin forming member 172 will be described by way of example.

Figure 12:
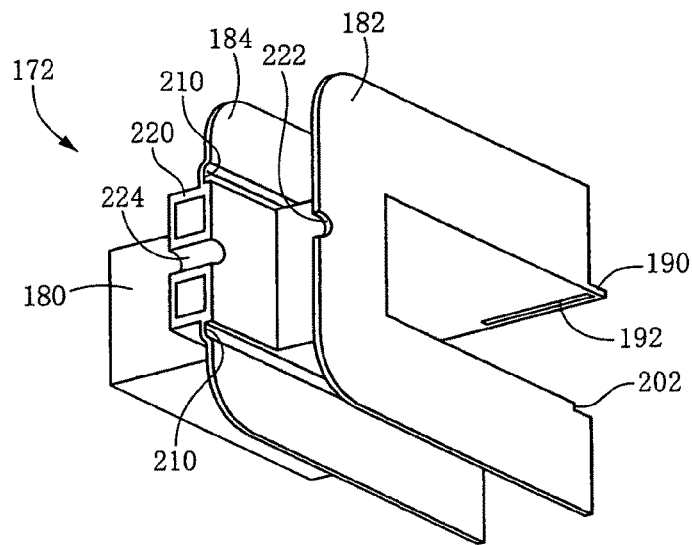
FIG. 12 is a perspective view of one of two bobbin forming members forming each bobbin shown in FIG. 9.
Figure 14:
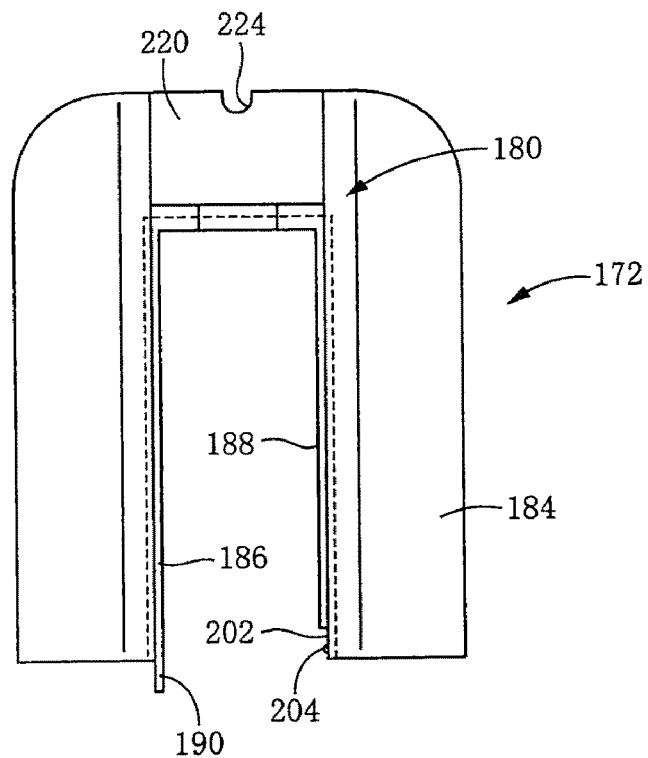
FIG. 14 is a left side elevational view of the bobbin forming member shown in FIG. 12.
Figure 15:
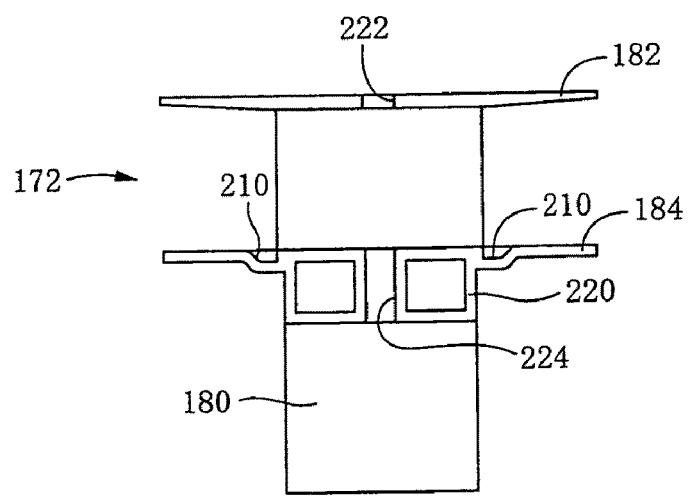
FIG. 15 is a plan view of the bobbin forming member shown in FIG. 12.

The bobbin forming member 172 includes a sleeve portion 180 which is U-shaped in transverse cross section, as shown in FIGS. 12 and 14, and further includes a pair of outward flange portions 182, 184 which outwardly extend from the sleeve portion 180 in the Y-axis direction. As shown in FIG. 15, the outward flange portion 182 extends from one end of the sleeve portion 180 as viewed in the X-axis direction, while the other outward flange portion 184 extends from a part of the sleeve portion 180 which is spaced from the above-indicated one end toward the other end and which is located between the above-indicated one end and a central part as viewed in the X-axis direction.

Figure 13:
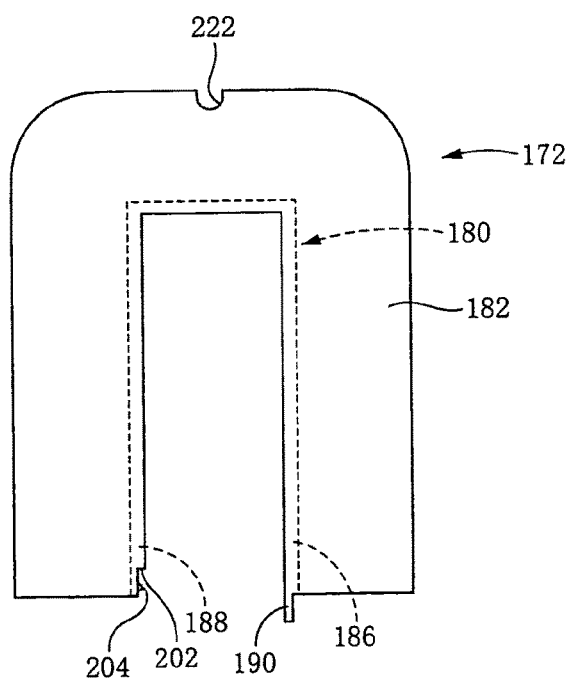
FIG. 13 is a right side elevational view of the bobbin forming member shown in FIG. 12.
Figure 16:
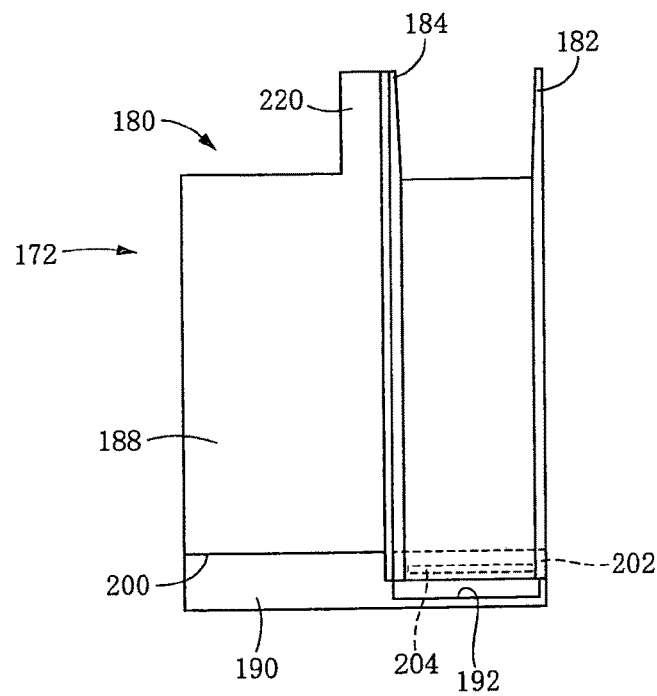
FIG. 16 is a front elevational view of the bobbin forming member shown in FIG. 12.

As shown in FIGS. 13 and 16, the sleeve portion 180 has a pair of side wall parts 186, 188, which constitute two arms of the U-shape of the sleeve portion 180. The side wall part 186 has a protrusion 190 extending from its end at which the two bobbin forming members 172, 174 are butted together to form the bobbin 170. The protrusion 190 extends in the vertical direction. The protrusion 190 has a slit 192 formed in a portion thereof between the pair of outward flange portions 182, 184. The protrusion 190 has a smaller thickness than a part of the side wall part 186 between the pair of outward flange portions 182, 184, and has an inner surface (opposed to the side wall part 188) which is flush with the inner surface of the side wall part 186, and an outer surface which is spaced from a portion of the outer surface of the side wall part 186 between the pair of external flange portions 182, 184, in the direction toward the inner surface.

As shown in FIG. 16, a portion of the side wall part 188 of the sleeve portion 180, which portion is other than a portion between the pair of outward flange portions 182, 184, has a smaller dimension in the vertical direction, than the portion between the pair of outward flange portions 182, 184, so that the side wall part 188 has a recessed portion 200 which is indented from the end face at which the bobbin forming members 172, 174 are butted together to form the bobbin 170. As shown in FIGS. 13 and 14, the portion of the inner surface of the side wall port 188 which is between the pair of outward flange portions 182, 184 has a recessed portion 202 adjacent to the inner surface of the recessed portion 200 in the X-axis direction. The recessed portion 202 has a projection 204 formed on its inner surface so as to extend in the Y-axis direction.

Figure 17:
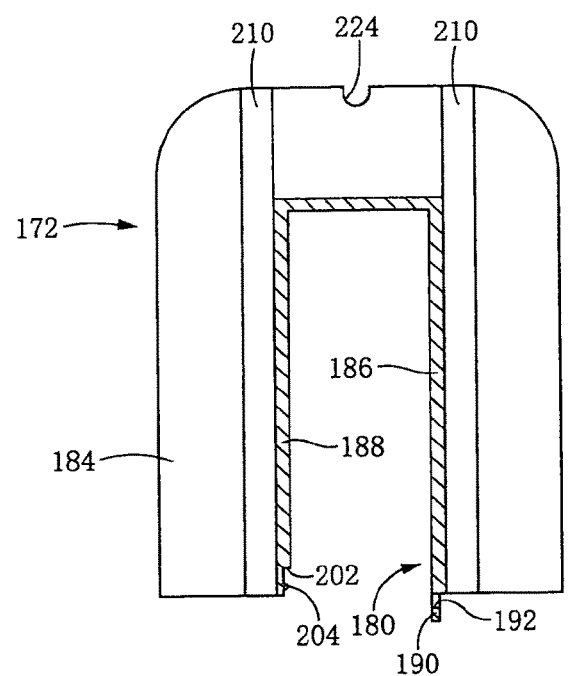
FIG. 17 is a side elevational view in cross section of the bobbin forming member shown in FIG. 12.
Figure 18:
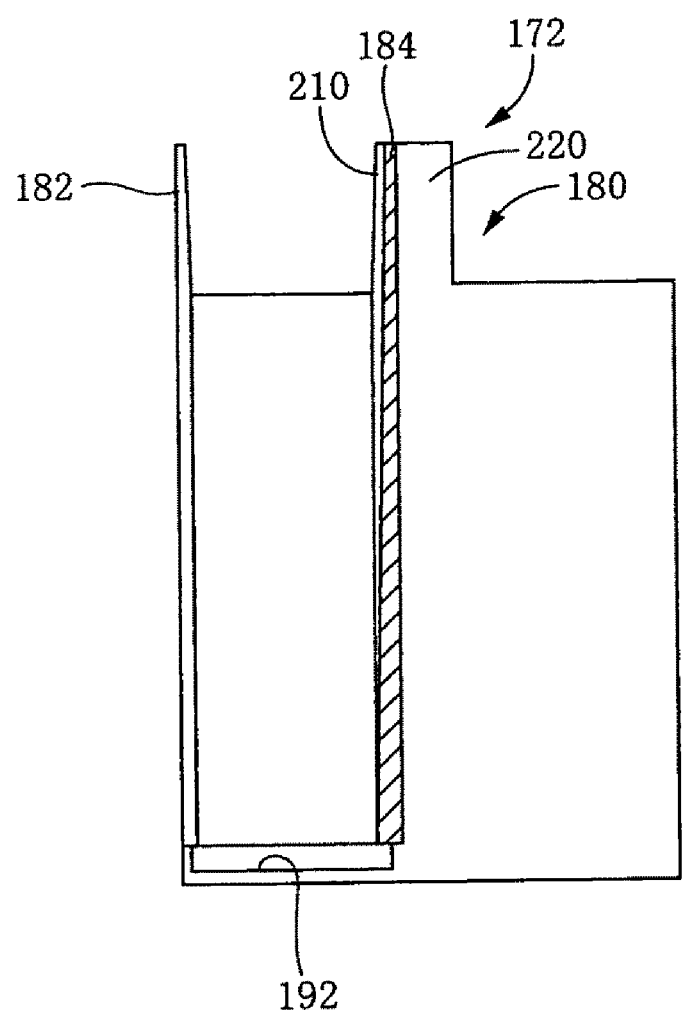
FIG. 18 is a rear elevational view showing in cross section a slit portion of the bobbin forming member shown in FIG. 12.

As shown in FIGS. 15, 17 and 18, the outward flange portion 184 which is nearer to the above-described central part of the sleeve portion 180 in the X-axis direction has two grooves 210 formed in its inner side surface opposed to the other outward flange portion 182. The two grooves 210 are contiguous with the two outer side surfaces of the sleeve portion 180 that are parallel to the X-axis direction and perpendicular to the Y-axis direction. The two grooves 210 extend to the outer edge of the inner side surface of the outward flange portion 184, which outer edge is opposite, in the vertical direction, to the end face of the outward flange portion 184 at which the bobbin forming members 172, 174 are butted together to form the bobbin 170. The grooves 210 have a depth which increases as the grooves 210 extend in the direction toward the above-described outer edge. The depth of each groove 210 at its end portion corresponding to the above-described outer edge of the outward flange portion 184 (and which extends from the corresponding end face of the sleeve portion 180 in the vertical directions is just sufficient to accommodate the winding of the coil 140. The end of the groove 210 which is opposite to the above-described end portion and at which the bobbin forming members 172, 174 are butted together to form the bobbin 170 is flush with the inner side surface of the external flange portion 184.

As shown in FIGS. 15 and 18, the bobbin forming member 172 has a rib 220 formed on the outward flange portion 184 which has the grooves 210. The rib 220 reinforces the bobbin forming member 172. The external flange portions 182, 184 have respective cutouts 222, 224 formed through the widthwise central parts of their outer edge portions so as to extend therethrough in the X-axis direction. The cutout 222 of the outward flange portion 184 extends through the rib 220. The cutouts 222, 224 have a circular shape in transverse cross section.

Figure 7:
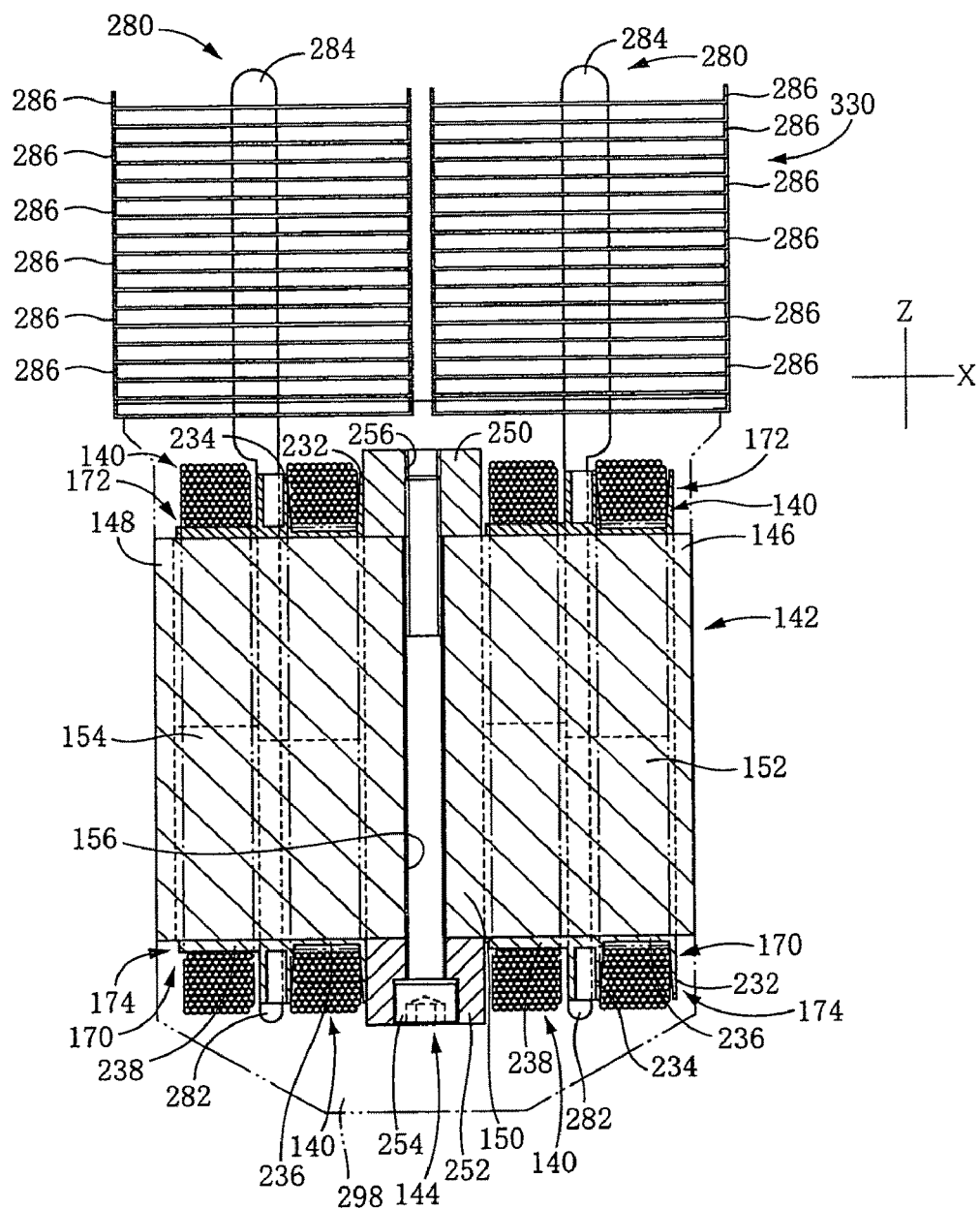
FIG. 7 is a front elevational view in cross section of the armature shown in FIG. 4.

As shown in FIG. 7, the two pairs of bobbin forming members 172, 174 of each core block 142 cooperate to constitute each of the two coil winding portions 152, 154 of the core block 142, thereby providing the two the bobbins 170. In other words, the two bobbins 170 are provided at two positions on the core block 142, which are spaced apart from each other in the X-axis direction, and the two coils 140 are wound on the respective two bobbins 170. Taking the coil winding portion 152, for example, the bobbin forming member 172 is fitted at its sleeve portion 180 on the coil winding portion 152 disposed on one side of the core block 142 as viewed in the vertical direction, while the bobbin forming member 174 is fitted at its sleeve portion 180 on the coil winding portion 152 disposed on the other side of the core block 142. The bobbin forming members 172, 174 are fitted on the coil winding portion 152 such that the two outward flange portions 182 of the two bobbin forming members 172, 174 are located at one position in the X-axis direction while the two outward flange portions 184 are located at another position in the X-axis direction, and such that the bobbin forming members 172, 174 are butted together, with the projection 204 being held in engagement with the slit 192 in the Y-axis direction. In the bobbin 170, an engaging projecting portion in the from of the projection 204 and an engaging recessed portion in the form of the slit 192, which are formed in each of the bobbin forming members 172, 174, respectively constitute a first engaging portion and a second engaging portion.

As shown in FIG. 11, a portion of the protrusion 190 in which the slit 192 is not formed is fitted in the recessed portion 200, to permit the fitting of the projection 204 in the slit 192. The projection 204 is formed on the inner surface of the recessed portion 202 which is inwardly spaced from the inner surface of the side wall part 188 of the sleeve portion 180, and the protrusion 190 in which the slit 192 is formed has a smaller thickness so that the inner surfaces of the sleeve portions 180 of the two bobbin forming members 172, 174 are flush with each other without steps, with the projection 204 being fitted in the slit 192, as shown in FIG. 10. Further, the outer surfaces of the sleeve portions 180 between the outward flange portions 182, 184 are also flush with each other, providing flat coil winding surfaces without steps.

As described above, the bobbin 170 is formed by the bobbin forming members 172, 174 which are fitted on the core block 142 and butted together. As shown in FIGS. 10 and 11, the bobbin 170 includes a square sleeve portion 230 formed by the sleeve portions 180 of the bobbin forming members 172, 174. The square sleeve portion 230 has a rectangular shape in transverse cross section, and provides the coil winding portion 152 of the core block 142. The bobbin 170 further includes a pair of outward flanges 232, 234 which are provided by the outward flange portions 182, 184 of the bobbin forming members 172, 174 and which outwardly extend from the square sleeve portion 230. The two outward flanges 232, 234 respectively extend from two positions of the square sleeve portion 230 which are spaced from each other in the X-axis direction and which are located on one side of a central position of the square sleeve portion 230 as viewed in the X-axis position, more specifically, extend from one end of the square sleeve portion 230 as viewed in the X-axis direction and a position between this one end and the above-indicated central position.

As shown in FIG. 9, the square sleeve portion 230 has a dimension in the X-axis direction, which is equal to a distance between the corresponding flange 146, 148 and the fixing portion 150 of the core block 142. A portion of the square sleeve portion 230 between the two outward flanges 232, 234 constitutes a coil winding portion 236, while the other portion of the square sleeve portion 230 on one side of the outward flange 234 remote from the other outward flange 232 constitutes a spacer 238, which causes the pair of outward flanges 232, 234 to be located on one side of the central position of the square sleeve portion 230, which is nearer to the flange 146 in the X-axis direction. The spacers 238 provided on the core blocks 142 permit the coils 140 to be wound on the coil winding portions 152 such that the coils 140 are disposed in a zigzag pattern, without the coils 140 wound in some areas of the coil winding portions 152, as understood from the following description by reference to FIGS. 20A-20C and FIG. 21. The four grooves 210 are formed in the inner surface of the outward flange 234 which is opposed to the outward flange 232 in the X-axis direction. These grooves 210 are contiguous with the two outer surfaces of the square sleeve portion 230 parallel to the X-axis direction and perpendicular to the Y-axis direction, and extend to the outer edges of the inner surface of the outward flange 234. The grooves 210 have the largest depth at the outer edges. The bobbin 170 can be easily obtained by butting together the two bobbin forming members 172, 174 of the same construction.

Figure 21:
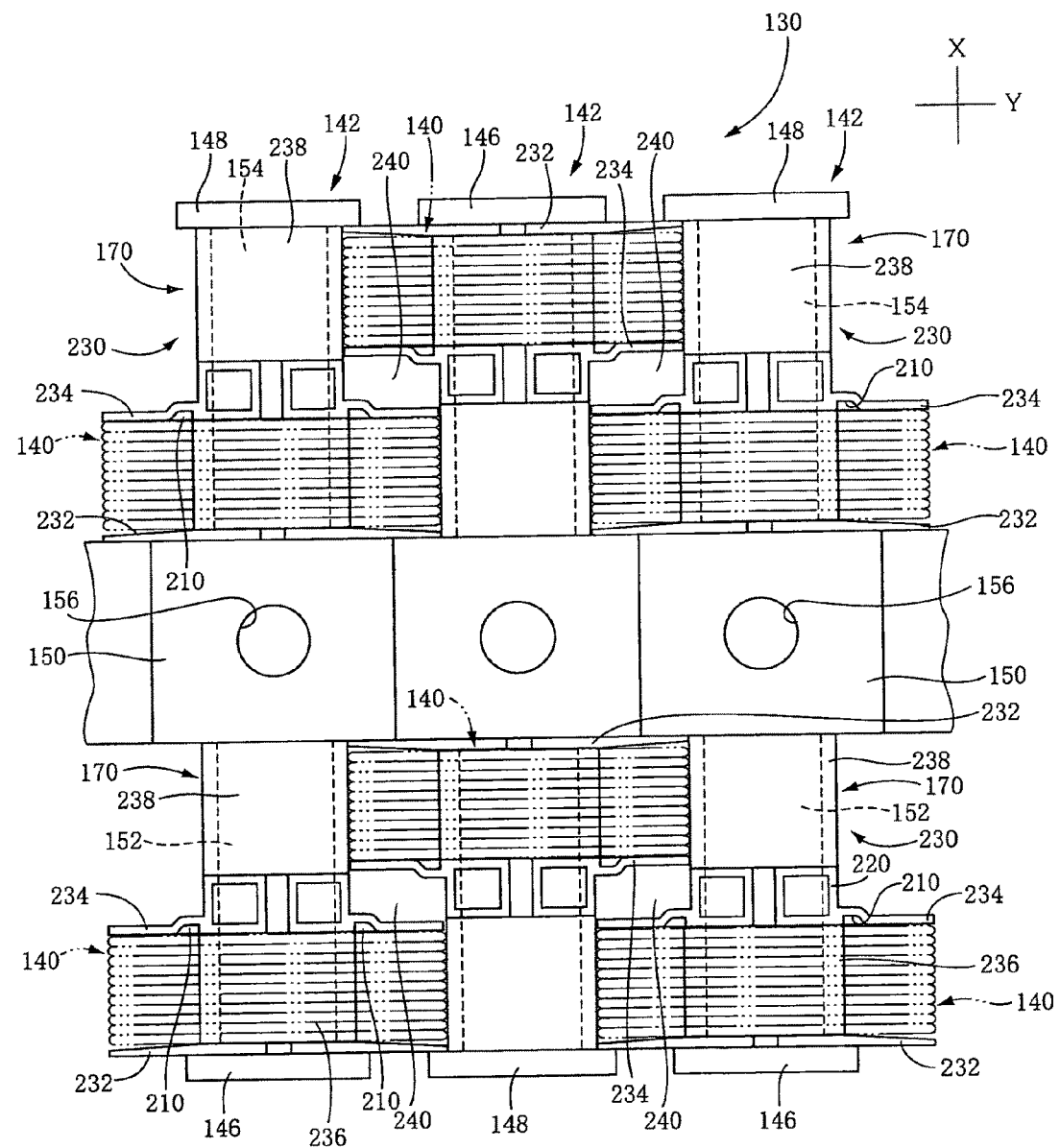
FIG. 21 is a plan view showing the bobbins provided on each core block in a longitudinal portion of the armature shown in FIG. 4, and the coils wound on the bobbins.

Similarly, the bobbin forming members 172, 174 are fitted on the coil winding portion 154 of the core block 142, to form the bobbin 170. As shown in FIG. 21, the bobbin forming members 172, 174 in the coil winding portion 154 are butted together with the same orientation in the X-axis direction as those in the coil winding portion 152, such that the two outward flanges 232, 234 outwardly extend from respective two positions of the square sleeve 230 which are on one side of the central position as viewed in the X-axis direction. Since the two bobbins 170 are provided on the core block 142 with the same orientation as viewed in the X-axis direction, the outward flanges 232, 234 of one of the two bobbins 170 are located on the side of the fixing portion 150, while the outward flanges 232, 234 of the other bobbin 170 are located on the side of the flange 146. The two coil winding portions 152, 154 of the core block 142 have the same shape and dimensions, and the two flanges 146, 148 of the core block 142 have the same shape and dimensions, so that the two bobbins 170 can be easily formed on the core block 142 with the same orientation in the X-axis direction, without distinction between the two coil winding portions 152, 154 and distinction between the two flanges 146, 148.

As described above, the coils 140 are formed by winding a conductive wire on a portion of each of the two bobbins 170 provided on each core block 142, which portion is located between the pair of outward flanges 232, 234. The linear motors 72, 74 are operated with an alternating current having three phases consisting of a U phase, a V phase and a W phase. As shown in FIGS. 5 and 19, the armature 130 includes two sets of coils 140 each set consisting of a group of six coils 140 of the U phase wound on the adjacent three core blocks 142, a group of six coils 140 of the V phase wound on the adjacent three core blocks 142, and a group of six coils of the W phase wound on the adjacent three core blocks 142. In each of the two sets of coils 140, the three groups of coils 140 of the U, V and W phases are connected to each other.

Figure 20A:
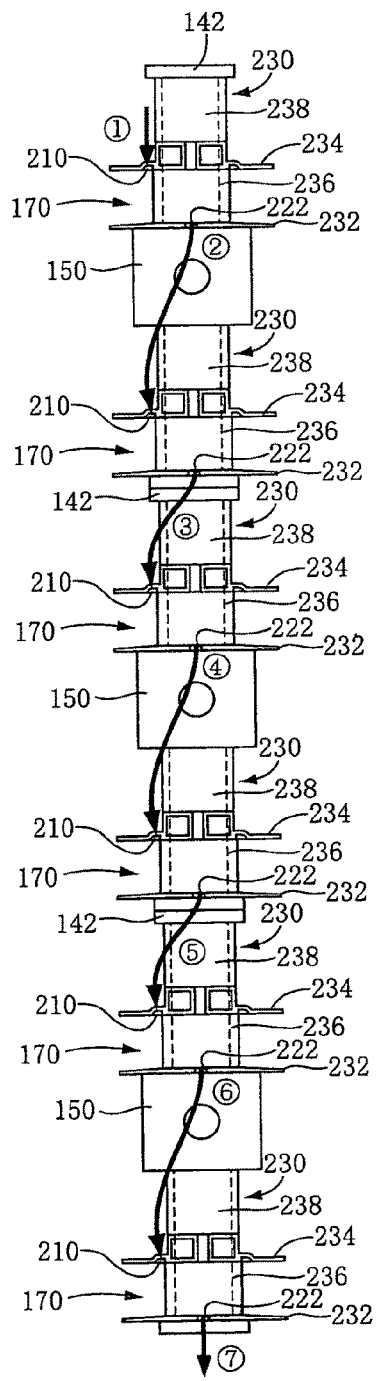
FIGS. 20A, 20B and 20C are views for explaining the winding of the coils on the three core blocks of the same one of three phases of the armature shown in FIG. 4.

The six coils 140 of each of the U, V and W phases are continuously wound on the three core blocks 142, in the order indicated in FIG. 19. This figure indicates the order of winding of the wire of each phase, and the wire connections of the coils 140 as viewed in the upward direction. For the six coils 140 of each of the two groups for each of the three phases, the three core blocks 142 are set in series on a positioning jig (not shown), as shown in FIG. 20A, such that the two bobbins 170 of each of the three core blocks 142 are oriented in the same direction in the X-axis direction and such that one of the two bobbins 170 the outward flanges 232, 234 of which are adjacent to the fixing portion 150 are located on the upstream side as viewed in the coil winding direction. Initially, the coil 140 is wound on the first core block 142, between the outward flanges 232, 234 of the upstream bobbin 170 located on the upstream side as viewed in the coil winding direction.

Figure 20B:
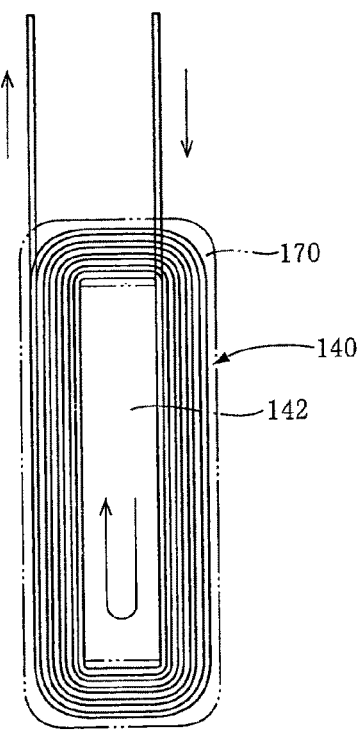

The coil 140 is wound such that the initial end portion of the wire of the coil 140 extends downwards while the terminal end portion of the wire extends upwards, as indicated in FIG. 20B. In FIG. 5, lower and upper bars located below and above the characters U, V and W representing the U, V and W phases indicate the direction of energization of the coils 140. The wire is wound in the same direction as the direction of energization of the coils 140. The initial end portion of the wire is fitted in the grooves 210 formed in the outward flange 234 so that the initial end portion is guided to be brought into contact with the outer surfaces of the square sleeve portion 230. The following portion of the wire is wound on the square sleeve portion 230. The reason why the four grooves 210 are formed in each bobbin 170 will be described later.

The initial end portion of the coil 140 wound on the first or upstream bobbin 170 is passed through the cutout 222 formed in the outward flange 232, as indicated in FIG. 20A. The wire is then brought into the grooves 210 formed in the outward flange 234 of the second or downstream bobbin 170, and wound on the square sleeve portion 230 of the downstream bobbin 170. The wire passed through the cutout 222 of the outward flange 232 of the upstream bobbin 170 is effectively prevented from being disengaged from the upstream bobbin 170, without movements of the wire with respect to the outward flange 232 in the Y-axis direction and in the vertical direction. It will be understood that the cutout 222 functions as an engaging portion in the form of an engaging recess, which corresponds to a disengagement preventive portion. After the two coils 140 are wound on the two bobbins 170 of the first core block 142, the wire is then wound on the two bobbins 170 of the second core block 142, in the same manner as the wire wound on the bobbins 170 of the first core block 142. A single wire is used for the six coils 140 wound on the three core blocks 142 of the same phase. Namely, the six coils 140 are formed of the single wire without any connection.

Figure 20C:
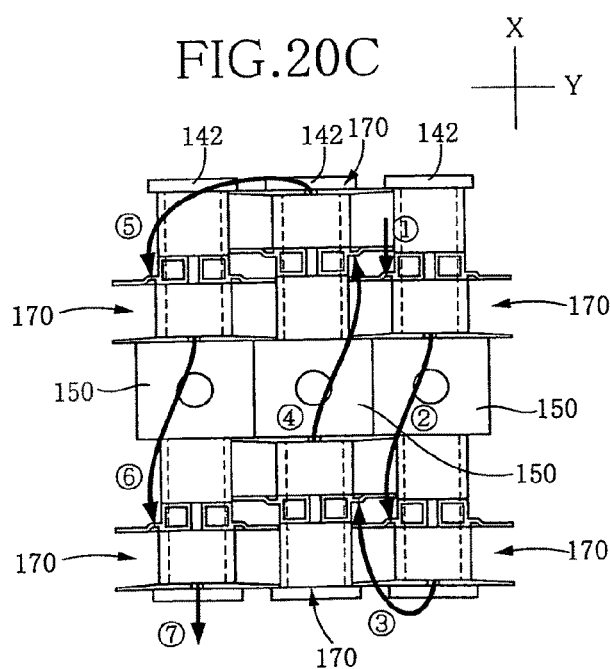

After the six coils 140 are wound on the three core blocks 142, as described above by reference to FIG. 20A, the three core blocks 142 arranged in series as shown in FIG. 20A are re-positioned in parallel with each other as shown in FIG. 20C such that the second core block 142 is reversed in the X-axis direction with respect to the first and third core blocks 142, with the second core block 142 being rotated through 180° about a vertical axis parallel to the Z-axis direction, and the fixing portions 150 of the three core blocks 142 arranged in parallel with each other are brought into abutting engagement with each other. Accordingly, the orientation of the two bobbins 170 of the second core block 142 in the X-axis direction is reversed with respect to that of the four bobbins 170 of the first and third core blocks 142, so that the two coils 140 of one of the two core blocks 142 that are adjacent to each other in the Y-axis direction are located at positions different from those of the two coils 140 of the other core block 142 in the X-axis direction, and overlap the two coils 140 of the other core block 142 in the Y-axis direction, whereby the coils 140 are arranged in the zigzag pattern in the Y-axis direction, as indicated in FIGS. 20C and 21 showing the coils 140 on the three core blocks 142. FIG. 19 indicates the order of winding of the coils 140 on the bobbins 170 of the three core blocks 142. FIG. 19 shows a total of six sets of core blocks each set consisting of the three core blocks 142. FIGS. 20A and 20C show the core blocks 142 as viewed in the downward direction, while FIG. 19 shows the armature 130 as viewed in the upward direction. In FIG. 19, numbers following "a" and "b" represent the order of winding of the coils 140, and "IN" indicates the initial end portion of each coil 140 while "OUT" indicates the terminal end portion of the coil 140.

It is also noted that the two outward flanges 232, 234 of each bobbin 170 are offset from the central position of the square sleeve portion 230 in the X-axis direction, so that a gap 240 is provided in the X-axis direction between the outer surfaces of the outward flanges 234 of each bobbin 170 of the two adjacent core blocks 142, and between the two coils 140 on the two adjacent core blocks 142 that overlap each other in the Y-axis direction, as shown in FIG. 21. Accordingly, the coils 140 are disposed in the zigzag pattern with the gaps 240 left between the outer surfaces of the two outward flanges 234 of the bobbins 170 of the two adjacent core blocks 142. The outer surface of these two outward flanges 234 is remote from the outward flange 232.

As described above, the coil 140 is wound in a selected part of the dimension in the X-axis direction of each of the two bobbins 170 provided on each core block 142, but the coils 140 are wound on the bobbins 170 over the entire dimension of the gap left in the Y-axis direction between the adjacent core blocks 142, so that the number of the coils 140 that can be wound on the coil winding portion 152, 154 is the same as that of the coils 140 that can be wound in a non-zigzag pattern in the entirety of the dimension in the X-axis direction of the coil winding portion 152, 154.

In each of the above-indicated two sets of coils 140, the six coils 140 are continuously formed of a single conductive wire, on the adjacent three core blocks 142 of each one of the three phases U, V and W. The six groups of coils 140 in the above-indicated two sets are arranged in the order of W, V and U phases, as indicated in FIG. 19. The adjacent three core blocks 142 of the same phase, and the adjacent two core bocks 142 of the two different phases are oriented in the opposite directions in the X-axis direction, with 180° rotation with respect to each other. On one side of the fixing portions 150 of the core blocks 142 as viewed in the X-axis direction, two rows of the coils 140 are arranged in the zigzag pattern in the Y-axis direction along one of the two permanent magnet rows 120, 122. Similarly, two rows of the coils 140 are arranged in the zigzag pattern in the Y-axis direction along the other permanent magnet row 120, 122, on the other side of the fixing portion 150. The three groups of coils 140 of the respective W, V and U phases in each of the above-indicated two sets are connected to each other, and the two groups of the coils 140 of the same phase in the respective two sets are connected to each other. The conductive wire for each of the six groups of coils 140 has two connecting end portions provided with caulking members, which are mechanically caulked at a total of five positions.

The plurality of core blocks 142 arranged as described above are connected to each other by beam members 250, 252, as shown in FIGS. 4, 6 and 7. The beam members 250, 252 are bars having a rectangular shape in transverse cross section, and are formed of a non-magnetic material in the form of an aluminum alloy. The beam member 250 is held in abutting contact with the upper end faces of the fixing portions 150 of the core blocks 142, while the other beam member 252 is held in abutting contact with the lower end faces of the fixing portions 150. As shown in FIG. 7, a fastening member in the form of a screw 254 is inserted through the lower beam member 252, and through the through hole 156 of the fixing portion 150 of each core block 142, and is screwed into tapped holes 256 formed through the upper beam member 250, so that the upper and lower beam members 250, 252 are forced against the respective upper and lower end faces of the fixing portions 150 of the plurality of core blocks 142, in the vertical direction, whereby the core blocks 142 are connected together. Like the core blocks 142, the screws 254 are formed of a ferromagnetic material. The through holes 156 have a diameter determined to provide a radial clearance of not larger than 0.025 mm with respect to the screws 254. In the present linear motors 72, 74, the upper beam member 250 having the tapped holes 256, the lower beam member 252, and the plurality of screws 254 cooperate to constitute the fixing device 144 described above. The pitch between the adjacent core blocks 142 in the Y-axis direction is determined by the fixing portions 150 held in abutting contact with each other as shown in FIG. 21, and a predetermined spacing is provided between the outward flanges 146, 148 of the adjacent core blocks 142, as also shown in FIG. 21. In the present armature 130, the fixing portion 150 of each core block 142 functions as a Y-axis-direction positioning portion of the core block 142.

Each of the plurality of core blocks 142 connected together as described above is provided with the two coils 140 which are spaced apart from each other in the X-axis direction. In this respect, each core block 142 can be considered to consist of two core blocks integrally connected to each other. As previously described, On one side of the fixing portions 150 of the core blocks 142 as viewed in the X-axis direction, the two rows of the coils 140 disposed on one side of the fixing portions 150 of the core blocks 142 are arranged in the zigzag pattern in the Y-axis direction along one of the two permanent magnet rows 120, 122, with the gap 240 being left in the X-axis direction between the coils 140 on the two adjacent core blocks 142. Similarly, the two rows of the coils 140 disposed on the other side of the fixing portions 150 are similarly arranged in the zigzag pattern in the Y-axis direction along the other permanent magnet row 120, 122.

The gaps 240 formed between the coils 140 on the adjacent core blocks 142 extend in the vertical or Z-axis direction, and lower end portions of heat pipes 280 are inserted, as shown in FIGS. 5 through 8. As shown in FIGS. 4, 5 and 7, each heat pipe 280 includes an lower end portion 282 inserted in the corresponding gap 240, with substantially no clearance therebetween, and a heat radiating portion 284 extending upwards from the core block 142 and outwardly of the gap 240. The lower end portion 282 has a rectangular shape in transverse cross section, while the heat radiating portion 284 has a circular shape in transverse cross section. The gap 240 is defined by the outward flanges 234 of the two bobbins 170 of the adjacent core blocks 142, so that the heat pipe 280 extends between the two coils 140 wound on the above-indicated two bobbins 170 such that the heat pipe 280 is electrically insulated from the two coils 140 by the outward flanges 234 which are formed of the electrically insulating synthetic resin. The rectangular lower end portion 282 is inserted in the gap 240 over the entire dimension of the gap 240 in the vertical direction, and the lower end of the lower end portion 282 is located downwardly of the bobbins 170, as shown in FIG. 7, so that heat conduction is effected by the heat pipe 280 over the entire dimension of the coils 140 in the vertical direction. The heat pipe 280 including the rectangular lower end portion 282 is a generally hollow sleeve which is formed of a metallic material having a high degree of heat conductivity, for example, copper, and which is provided with a capillary layer formed on its inner surface. The capillary layer is impregnated with a heat carrier liquid, so that heat is conducted to the upper end portion of the heat pipe 280, owing to evaporation and condensation of the heat carrier liquid, and radiated from the heat pipe 280. The heat pipe 280 may be formed of any other metallic material such as aluminum alloys.

Figure 22:
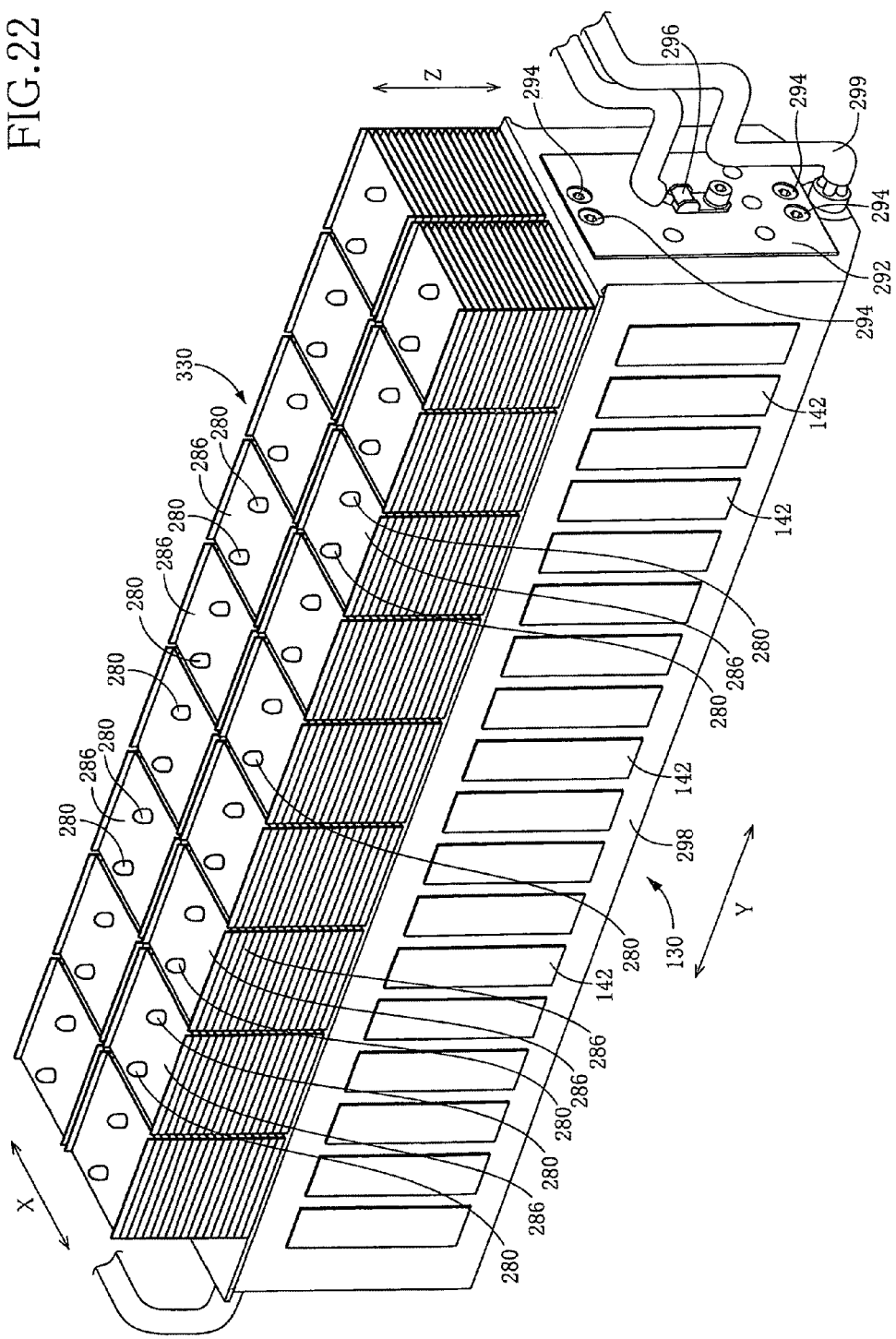
FIG. 22 is a perspective view showing the armature shown in FIG. 4, together with heat pipes and fins.
Figure 23:
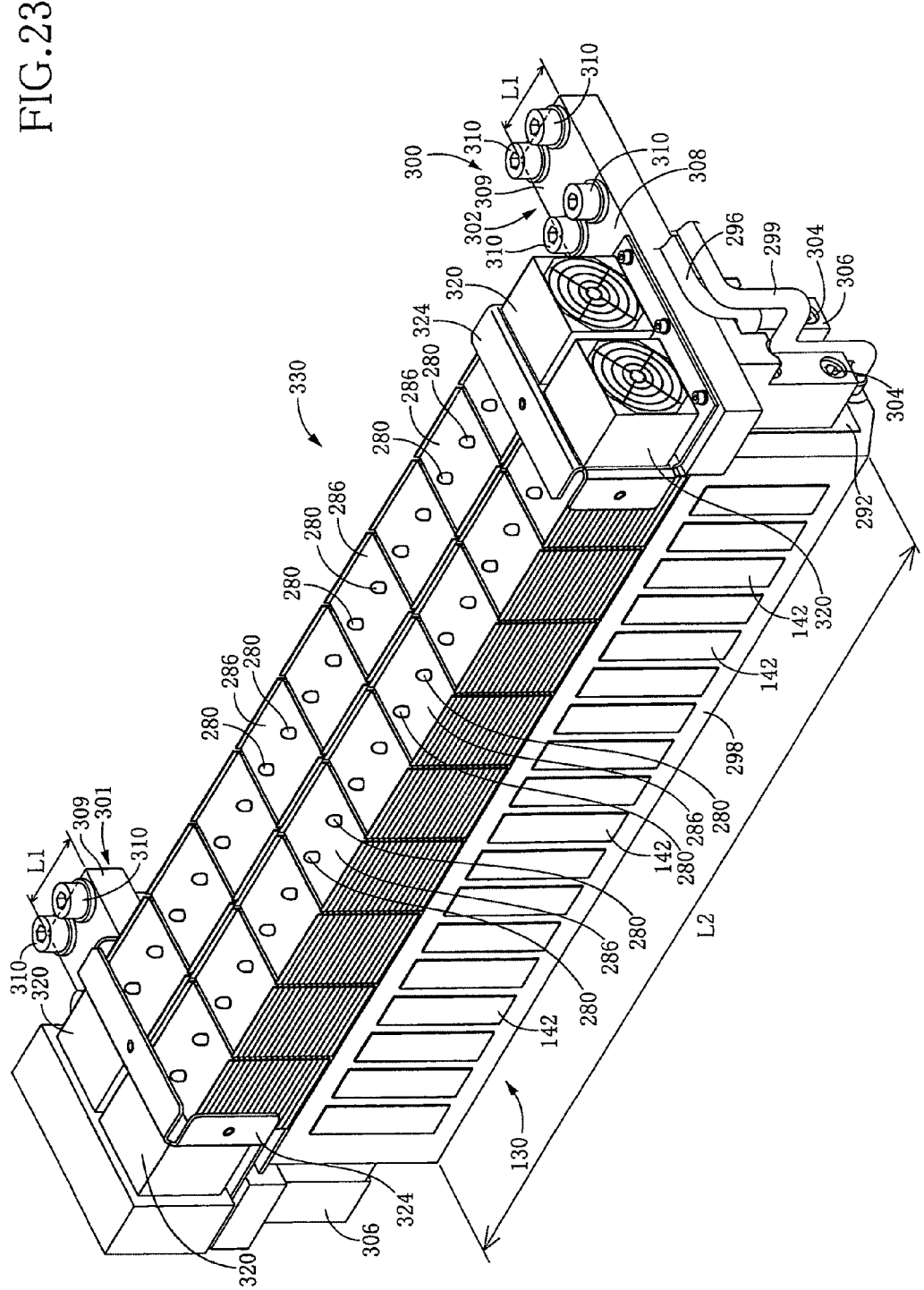
FIG. 23 is a perspective view showing fans and connecting arms attached to the armature shown in FIG. 22.

The heat radiating portion 282 is provided with a plurality of heat radiating fins 286 (hereinafter referred to simply as "fins 286"), as shown in FIGS. 6 and 7. Each of the fins 286 is formed of an aluminum material, and is U-shaped in cross section taken in a plane parallel to the X-axis direction, as shown in FIG. 7. For the two rows of coils 140 on the side of one of the two permanent magnet rows 120, 122, the heat radiating fins 286 are press-fitted on the heat radiating portions 284 of the two adjacent heat pipes 280, as shown in FIGS. 4, 7 and 22. The heating radiating fins 286 for the two rows of coils 140 on the side of the other permanent magnet row 120, 122 are press-fitted on the heat radiating portions 284 of the two adjacent heat pipes 280. The heat radiating fins 286 press-fitted on the heat radiating portions 284 of the two adjacent heat pipes 280 are superposed on each other to form a stack, as shown in FIG. 23. As shown in FIGS. 4 and 22, the stacks of the heat radiating fins 286 are arranged in the 4 Y-axis direction in two rows corresponding to the respective two permanent magnet rows 120, 122.

Figure 8:
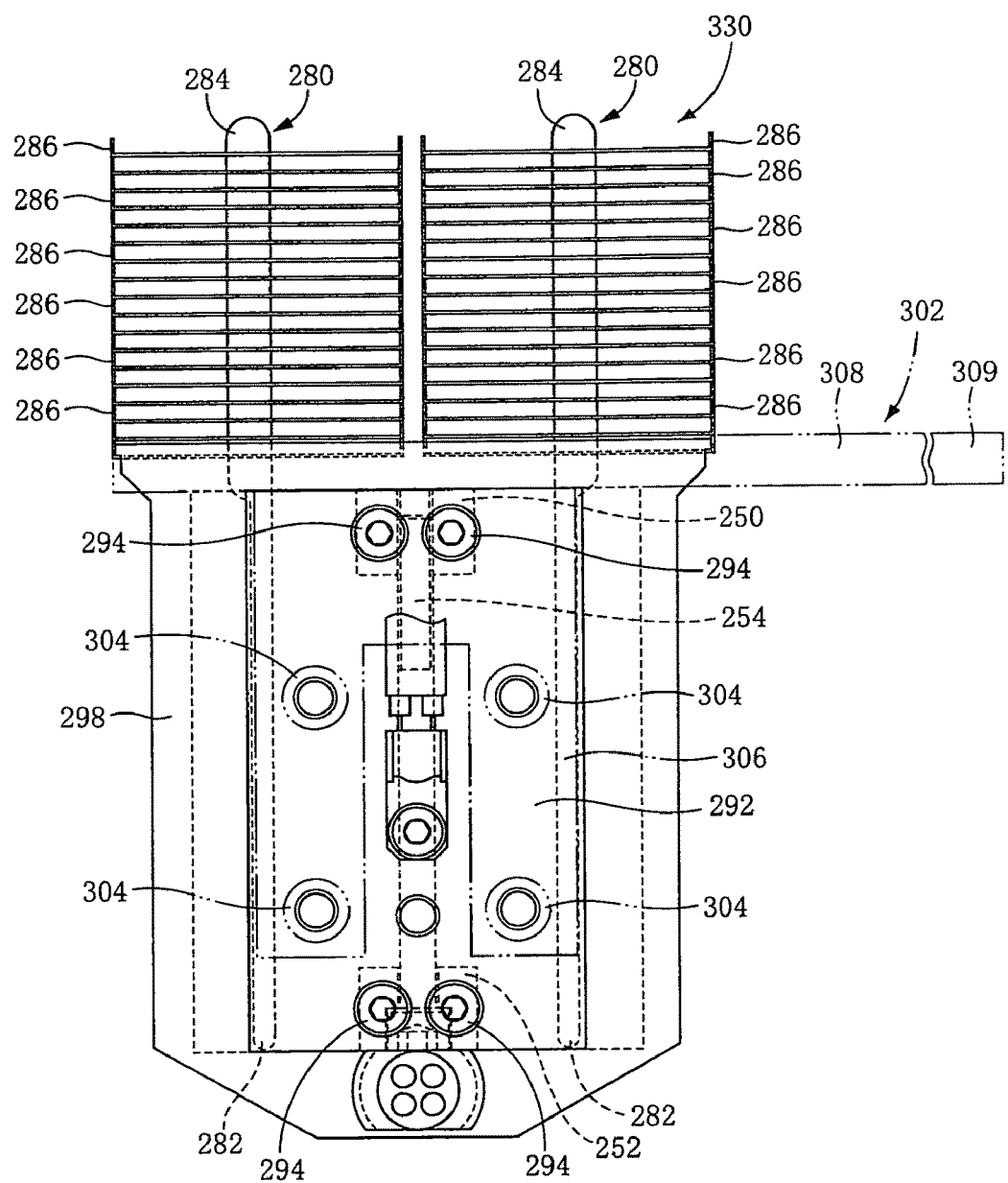
FIG. 8 is a front elevational view of the armature shown in FIG. 4.

As shown in FIGS. 4, 6 and 8, mounting members in the form of two mounting plates 290, 292 are fixed by screws 294 to respective two longitudinally opposite end faces of the beam members 250, 252, which are opposed to each other in the Y-axis direction. As shown in FIGS. 6 and 22, the two mounting plates 290, 292 are provided with respective temperature detecting devices in the form of thermocouples 296 to detect the temperature of the armature 130. Output signals of the thermocouples 296 are fed to a computer of a control device 360 (shown in FIG. 2). As shown in FIGS. 8 and 22, the core blocks 142, bobbins 170, coils 140, lower end portions 282 of the heat pipes 280, beam members 250, 252, mounting plates 290, 292 and the lowermost fins 286 are fixed together by a resinous body 298 formed of an epoxy resin or any other synthetic resin material. However, the opposite end faces of the core blocks 142 which are opposed to each other in the X-axis direction and the outer surfaces of the mounting plates 290, 292 are not covered by the resinous body 298, and are exposed to the atmosphere. The outer surfaces of the mounting plates 290, 292 are the opposite end faces of the armature 130 which are opposite to each other in the Y-axis direction. A current supply cable 299 for supplying an electric current to the coils 140 is fixed and covered at its end portion to and by the resinous body 298.

As shown in FIG. 25, the Y-axis slide 68 is connected to the armature 130 constructed as described above, by a connecting device in the form of a coupling device 300. The coupling device 300 includes two connecting members in the form of connector arms 301, 302, which are formed of a steel or any other metallic material. The connecting arms 301, 302 may be formed of a stainless steel. As shown in FIGS. 4, 8 and 23, each of the connector arms 301, 302 is provided at its longitudinal ends with respective fixing portions 306, 309. The fixing portion 306 is removably fixed to the mounting plate 290, 292 by a fixing device in the form of a plurality of screws 304. An arm portion 308 extends horizontally from the fixing portion 306 in the X-axis direction toward the above-described guide rail 78, and the fixing portion 309 is provided at a free end section of the arm portion 308. The arm portion 308 takes the form of an elongate plate, and extends from the armature 130 over the permanent magnet row 122, so that the fixing portion 309 is located on one side of the permanent magnet row 122 remote from the other permanent magnet row 120. The fixing portion 308 is removably fixed by a plurality of screws 310 to the above-described leg portion 86 fitted on the guide rail 78 of the Y-axis slide 68. The two connector arms 301, 302 are fixed to the respective end faces of the armature 130 which are opposed to each other in the Y-axis direction. The connector arms 301, 302 extend horizontally in the X-axis direction perpendicular to the Y-axis direction (in which the core blocks 142 are arranged), to fix and connect the armature 130 and the Y-axis slide 68 to each other such that the armature 130 and the Y-axis slide 68 are moved together as a unit). In the present linear motors 72, 74, each of the two connector arms 301, 302 has a dimension L1 (indicated in FIG. 23) in the Y-axis direction (in which the core blocks 142 are arranged) is about ⅒ of a dimension L2 (also indicated in FIG. 23) of the armature 130 in the Y-axis dimension. The dimension L1 is preferably ¼ or smaller of the dimension L2, and more preferably ⅙ or ⅛ or smaller of the dimension L2. When the electric current is applied to the coils 140 of the armature 130 fixed to the Y-axis slide 68 through the connector arms 301, 302, the armature 130 is moved in the Y-axis direction so that the Y-axis slide 68 is moved together with the armature 130, while being guided by the guide rails 78, 80. The guide rails 78 also functions as a guiding device for guiding the armature 130. The armature 130 is linearly moved in the Y-axis direction between the two permanent magnet rows 120, 122. Although a plurality of connecting members in the form of the two connector arms 301, 302 are preferably provided for connecting the armature 130 and the Y-axis slide 68 to each other, in the present embodiment, a single connecting member may be used for connecting the armature and the Y-axis slide 68 together. Further, the connecting members may be formed of a synthetic resin rather than the metallic material described above.

Figure 24:
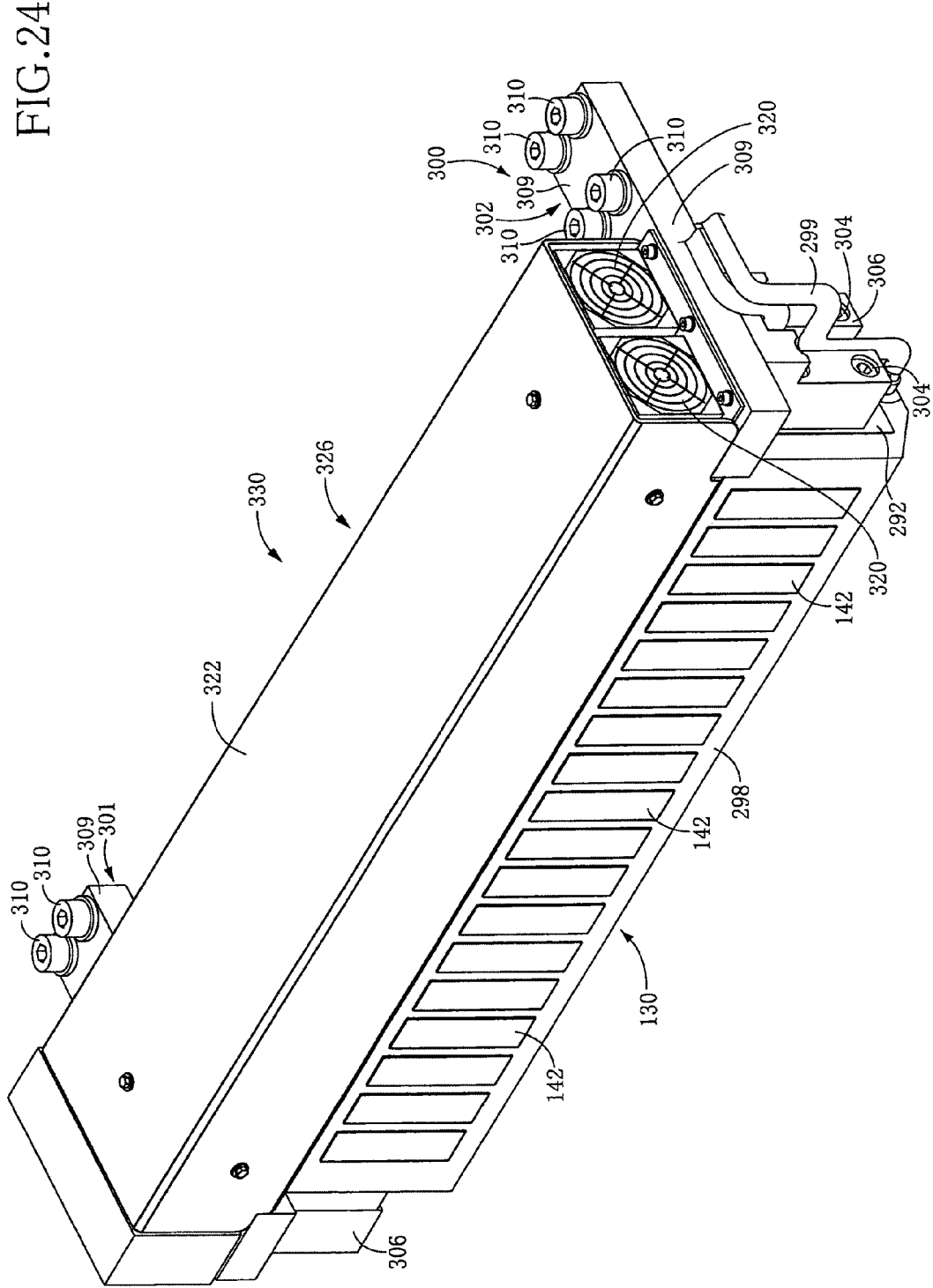
FIG. 24 is a perspective view showing a covering member mounted on the armature shown in FIG. 23.

As shown in FIG. 23, two fans 320 are provided on the respective opposite sides of each of the two rows of stacks of the fins 286. These fans 320 are fixed on the arm portion 308 of the fixing portion 306 of each connector arm 302, 302. The plurality of fins 286 fixed to the plurality of heat pipes 280 are all covered by a covering member 322, as shown in FIG. 24. The covering member 322 is U-shaped in cross section taken in a plane parallel to the X-axis direction and perpendicular to the Y-axis direction, so as to cover the two rows of the fins 386. The covering member 322 is fixed to fixing members in the form of two brackets 324, which are fixed to the armature 130 through the arm portion 308. The fans 320 are also fixed to these brackets 324. Accordingly, the covering member 322 cooperates with the resinous body 298 of the armature 130 to form an air flow passage 326 extending in the Y-axis direction. The air flow passage 326 is held at each of its opposite ends in communication with the two fans 320. It will be understood that the heat pipes 280, fans 286, fans 320 and covering member 322 (air flow passage 326) cooperate to constitute a heat radiating device 330 (shown in FIGS. 23 and 24). This heat radiating device 330 is provided in a space which is adjacent to the armature 130 in the vertical or Z-axis direction.

The base 20 described above is provided with a pair of columns 350 disposed in its central portion as viewed in the X-axis direction, as shown in FIG. 2. The two columns 350 extend in the vertical direction and are spaced from each other Y-axis direction. A covering member 352 extends between the upper end portions of the two columns 350, so as to cover a space above the linear motors 72, 74. The covering member 352 has at least one opening, more specifically, six openings 354 in the present embodiment. The six openings 354 are open upwards, and are arranged in two rows parallel to the Y-axis direction, which two rows are spaced apart from each other in the X-axis direction. Each row consists of the three openings 354 which are spaced apart from each other in the Y-axis direction in which the armatures 130, 132 of the linear motors 72, 74 are linearly moved. The three openings 354 respectively correspond to a central portion and two opposite end portions of the armature 130, 132 as viewed in the Y-axis direction. Exhaust fans 356 are disposed in the respective openings 354, to exhaust air upwards from the space within the covering member 352. It will be understood that the covering member 352 covers the linear motors 72, 74 of the Y-axis drive devices 64, 66 of the electronic-circuit-component mounting machine 12, and that the linear motors 72, 74 of the electronic-circuit-component mounting machine 12 are breathed or ventilated by the openings 354 and the fans 456.

The two holder heads 36, 38 of the electronic-circuit-component mounting portion 12 and the two holder heads 36, 38 of the other electronic-circuit-component mounting portion 14 are controlled by respective four computers of the above-indicated control device 360 (shown in FIG. 2).

In the electronic-circuit-component mounting machine constructed as described above, the two electronic-circuit-component mounting portions 12, 14 are operated to concurrently perform operations to mount electronic circuit components on the circuit boards 18. In each of the two electronic-circuit-component mounting portions 12, 14, the two holder heads 36, 38 are moved by the respective head moving devices 40, 42, to mount the electronic circuit components on the circuit board 18. The two holder heads 36, 38 of each electronic-circuit-component mounting portion 12, 14 are operated to alternately mount the electronic circuit components on the circuit board 18. Namely, one of the two holder heads 36, 38 mounts the electronic circuit components on the circuit board 18 while the other holder head 36, 38 is moved to the component supply device 30, 32 to receive the electronic circuit component from the selected feeder 44. After the operation of the above-described one holder head 36, 38 to mount the electronic circuit component on the circuit board 18, the other holder head 36, 38 then mounts the received electronic circuit component on the circuit board 18.

The holder heads 36, 38 are moved in the Y-axis direction by the respective linear motors 72, 74, and in the X-axis direction by the respective X-axis drive motors 102 (shown in FIG. 25). In each of the linear motors 72, 74, the electric current is applied to the plurality of coils 140, so that the thrust force is generated by electromagnetic actions between the coils 140 and the permanent magnets 126 of the permanent magnet rows 120, 122, whereby the armatures 130, 132 are moved. The positions of the Y-axis slides 69, 70 are detected by respective linear encoders (not shown), and the linear motors 72, 74 are controlled on the basis of output signals of the linear encoders, to move the Y-axis slides 68, 70 to the predetermined Y axis positions. The core blocks 142 are subjected to lines of magnetic forces as indicated in FIG. 3. The screws 254 used to fix the core blocks 142 to the beam members 250, 252 are formed of a ferromagnetic material, and an extremely small amount of gap is left between the screws 254 and the through holes 156, so that the screws 254 are subjected to the lines of magnetic forces, to assure stable generation of the thrust force without local areas having an extremely high magnetic flux density. Since the heat pipes 280 and beam members 250, 252 are formed of non-magnetic materials, the heat pipes 280 and beam members 250, 252 are not subjected to the lines of magnetic forces. The Y-axis slides 68, 70 connected to the respective armatures 130, 132 are moved to the predetermined positions in the Y-axis direction while being guided by the guide rails 78, 80. The beam members 250, 252 are formed of an aluminum alloy and have a specific gravity lower than that of the core blocks 142, to prevent an increase of the weight of the armatures 130, 132 and a decrease of the moving speed of the armatures 130 132.

The plurality of coils 140 of the armatures 130, 132 generate heat when the coils 140 are energized by the electric current supplied thereto. The heat is conducted by the heat pipes 280, and is radiated through the heat radiating portion 284 of each heat pipe 280; and the fins 286 fixed to the heat radiating portion 284. The heat is then dissipated into the space surrounding the armatures 130, 132, by air flows through the air flow passage 326, which air flows are generated by the fans 320. The lower end portion 282 of each heat pipe 280 has the rectangular shape in transverse cross section, and is inserted into the gap 240 defined by the outward flanges 234 of the bobbins 170 of the two adjacent core blocks 142. The lower end portion 282 is held in contact with the two coils 140 via the outward flanges 234 and a synthetic resin filling the gap. Since the lower end portion 282 has a relatively large surface area of contact with the two coils 140, the heat is radiated through the heat pipe 280 with high efficiency. The two fans 320 disposed on the opposite sides of each of the two rows of the heat pipes 280 in the Y-axis direction in which the core blocks 142 of each one of the two armatures 130, 132 are arranged are rotated to suck the air through one of the opposite open ends of the air flow passage 326 into the air flow passage 326 and to discharge the air through the other open end, which is remote from the other armature 130, 132. Namely, each fan 320 is rotated so that the air is sucked into the air flow passage 326 of the armature 130 through its inner open end opposed to the inner open end of the air flow passage 326 of the armature 132, and is discharged through the other outer open end remote from the armature 132. Similarly, the air is sucked into the air flow passage 326 of the armature 132 through its inner open end opposed to the inner open end of the air flow passage 326 of the armature 130, and is discharged through the other outer open end remote from the armature 130.

In addition, the fans 356 provided in the covering members 352 disposed above the linear motors 72, 74 are rotated so that the air the temperature of which is raised by the heat generated from the armatures 130, 132 is discharged through the openings 354 outwardly of the electronic-circuit-component mounting machine. As described above, the six openings 354 are formed in the covering member 352, in two rows parallel to the Y-axis direction, each row consisting of the three openings 354 which are spaced apart from each other in the Y-axis direction, so that the heated air is exhausted or discharged evenly through the six openings 354. Further, the heated air is discharged from the outer open ends of the two air flow passages 326 of the two armatures 130, 132 which are remote from the opposed inner open ends of the two air flow passages 326, so that the heat can be effectively dissipated. In addition, the operation of the fans 356 causes the air to flow toward the covering member 352 from the mounting areas in which the electronic circuit components are picked up and mounted by the moving holder heads 36, 38, and the air is discharged through the openings 354. Thus, the fans 356 prevents the heated air flows back into the mounting areas, reducing a risk of temperature rise in the mounting areas due to the heated air flows from the side of the linear motors 72, 74 into the mounting areas.

Thus, the armatures 130, 132 are cooled by heat radiation through the heat pipes 280 and fins 286 and the discharge flows of the heated air by the fans 320. Further, the armatures 130, 132 are connected or fixed to the Y-axis slides 68, 70 by only the arm portions 308 of the two connector arms 301, 302, so that the armatures 130, 132 and the connector arms 301, 302 have a relatively narrow surface area of contact therebetween. In addition, the connector arms 301, 302 extending over the permanent magnet row 122 have a relatively small surface area in transverse cross section, and a relatively dimension in its direction of connection, so that heat is difficult to be conducted from the armatures 130, 132 to the Y-axis slides 68, 70, whereby the Y-axis slides 68, 70, guide rail 78, etc. are effectively protected from thermal deformation. The fans 320, 356 are kept operated during the series of operations to mount the electronic circuit components on the circuit boards 18, so that the air flows through the air flow passage 326 and the discharge flows of the heated air through the openings 354 of the covering member 352 are continued to cool the armatures 130, 132 even while the Y-axis slides 68, 70 are held stationary.

Figure 26:
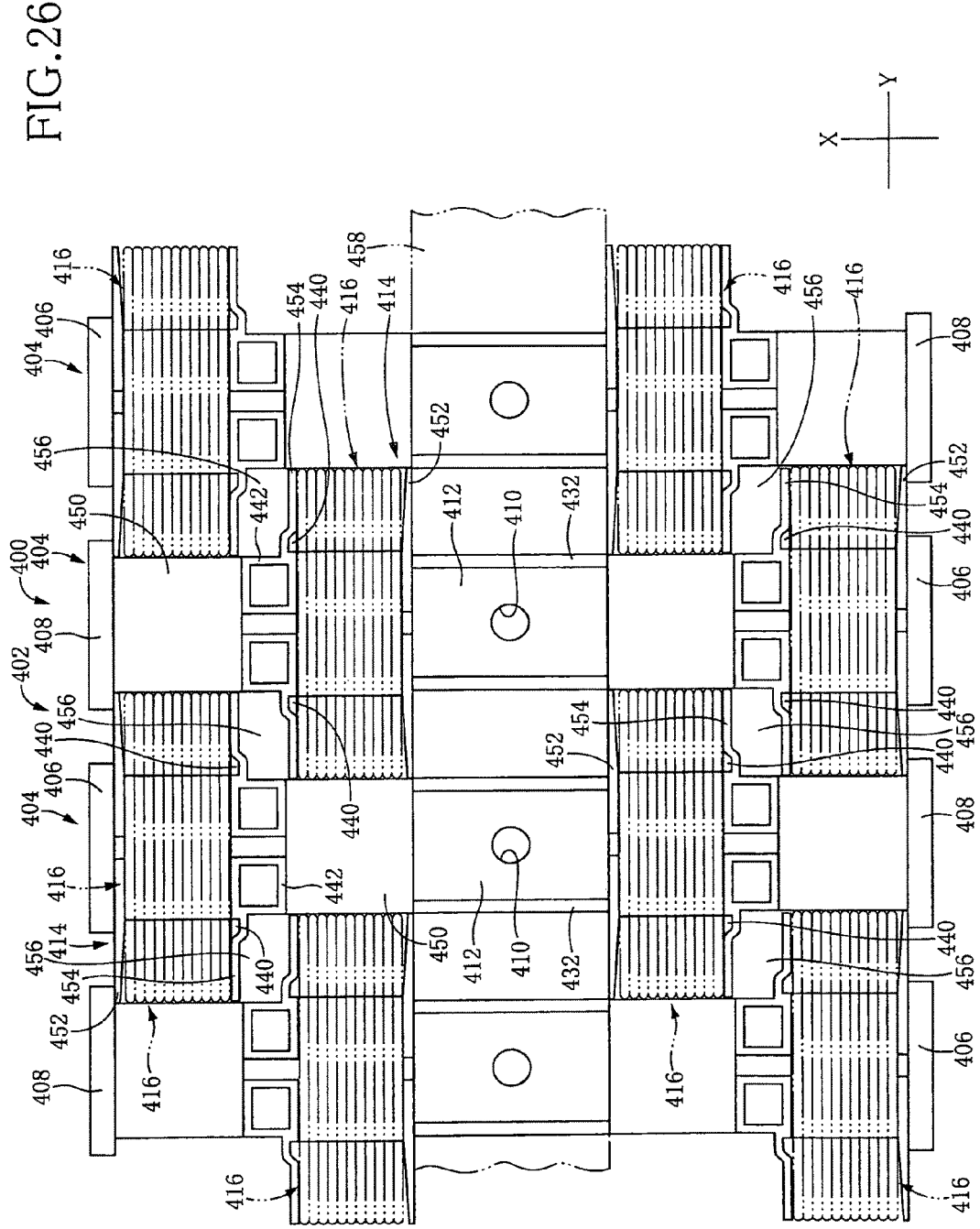
FIG. 26 is a plan view showing bobbins provided on respective core blocks in a longitudinal portion of an armature of a linear motor constructed according to a second embodiment of this invention, coils wound on the bobbins, and a beam member of a fixing device.
Figure 27:
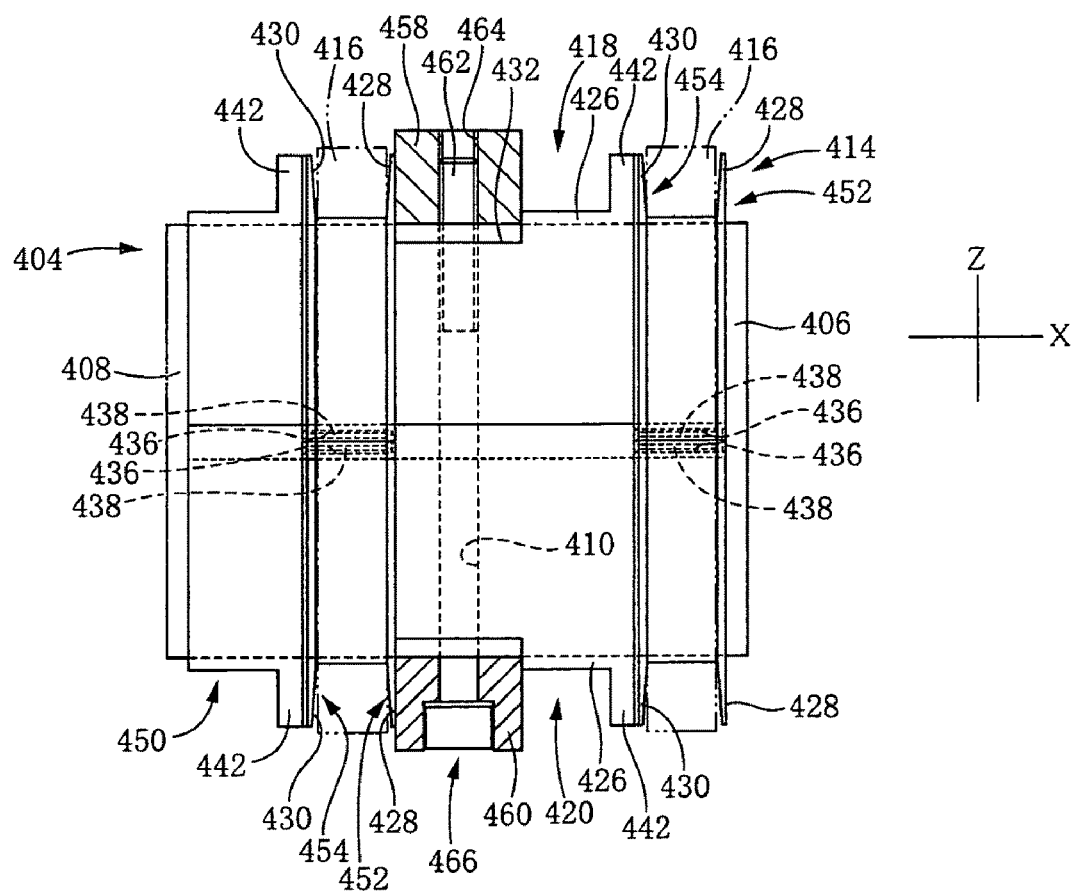
FIG. 27 is a front elevational view partly in cross section of one core block and the fixing device shown in FIG. 26.

Referring next to FIGS. 26 and 27, a linear motor 400 constructed according to a second embodiment of this invention will be described. As shown in FIG. 26, the present linear motor 400 includes an armature 402 including a plurality of core blocks 404. Each of the core blocks 404 takes the form of a generally rectangular plate having a generally rectangular shape in cross section taken in a vertical plane parallel to the X-axis and Z-axis directions and perpendicular to the Y-axis direction, and includes two flanges 406, 408 at the opposite ends of the rectangular plate as viewed in the X-axis direction. The core block 404 has a through hole 410 formed therethrough so as to extend in the Z-axis direction. A portion of the core block 404 in which the through hole 410 is formed constitutes a fixing portion 412 which has the same width as two portions of the core block 404 provided with bobbins 414 on which two coils 416 are wound. Each core block 404 has the two coils 417 wound at respective two positions of the bobbin 414 which are spaced from each other in the X-axis direction.

As shown in FIG. 27, each bobbin 414 consists of two bobbin forming members 418, 420 having the same shape and dimensions. For example, the bobbin forming member 418 includes a sleeve portion 426 which is U-shaped in transverse cross section and which has a length equal to a distance between the flanges 406, 408 of the core block 404, and further includes two pairs of outward flange portions 428, 430, one pair being formed at one end portion of the bobbin forming member 418, and the other pair being formed between this one end portion and the above-described fixing portion 412. The two pairs of outward flange portions 428, 430 are disposed on the respective opposite sides of the fixing portion 412. Namely, the outward flange portion 428 of the one pair of outward flange portions 428, 430 is located at one end of the sleeve portion 426 as viewed in the X-axis direction, while the other outward flange 430 of this pair is located at a part of the sleeve portion 426 between the above-described one end and the fixing portion 412, which part is located between the above-described one end and a midpoint between the connecting portion 312 and the above-indicated one end as viewed in the X-axis direction. The outward flange 428 of the other pair of outward flange portions 428, 430 is located at one end of the fixing portion 412 remote from the above-indicated one end of the sleeve portion 426, while the outward flange 430 of this pair is located at a part of the sleeve portion 426 between this end of the fixing portion 412 and the other end of the sleeve portion 426, which part is located between that end of the fixing portion 412 and a midpoint between the above-indicated one end of the fixing portion 412 and the above-indicated other end of the sleeve portion 426.

The sleeve portion 426 has openings 432 formed through a part of its bottom wall which corresponds to the fixing portion 412. The openings 432 are formed so as to extend in the Y-axis direction. Like the bobbin forming member 172 in the first embodiment, the bobbin forming member 418 has a slit 436 formed through one of a pair of side wall parts of the sleeve portion 426, as shown in FIG. 27. This slit 436 is formed between the two outward flange portions 428, 430. The bobbin forming member 418 further has a protrusion 438 formed on the other of the pair of side wall parts. As shown in FIG. 26, the outward flange 430 has two grooves 440 and a rib 442.

As shown in FIG. 27, the bobbin forming members 418, 420 are fitted on the core block 404 and butted together in the Z-axis direction, to constitute the bobbin 414, while the protrusions 438 are held in engagement with the slits 436. The bobbin 414 includes a square sleeve portion 450, and two pairs of outward flanges 452, 454 which are spaced from each other in the X-axis direction. A portion of the square sleeve portion 450 other than the coil winding portion between the outward flanges 452, 454 functions as a spacer. The bobbin 44 can be considered to consist of two bobbins which are integrally connected to each other and each of which has a square sleeve portion and a pair of flanges. Like the core blocks 142 in the first embodiment, the three core blocks 404 on which the bobbins 414 are provided are arranged in series with each other, and the coils 416 are wound between the outward flanges 452, 454. The second core block 404 is reversed in the X-axis direction with respect to the first and third core blocks 142, with the second core block 404 being rotated through 180° about the vertical axis perpendicular to the X-axis and Y-axis directions. Accordingly, the coils 416 are arranged in the zigzag pattern in the Y-axis direction, while gaps 456 are formed between the opposed outward flanges 454 of the adjacent core blocks 404, as shown in FIG. 26. As in the first embodiment, the lower end portions of heat pipes (not shown) are inserted in the gaps 456.

The upper and lower end faces of the fixing portion 412 of each core block 404 which are opposed to each other in the Z-axis direction are exposed to the ambient air through the openings 432 formed through the bobbin 414. The plurality of core blocks 404 are fixed together by beam members 458, 460 held in abutting contact with the upper and lower end faces of their fixing portions 412, with fastening members in the form of screws 462 being inserted through the through holes 410 from the side of the lower beam member 460 and screwed into tapped holes 464 formed in the other beam member 458. The beam members 458, 460, screws 460 and tapped holes 460 cooperate to constitute a fixing device 466. The fixing device 466 has a high degree of accuracy in the diameter and position of the tapped holes 464 and the holes of the beam member 460 in which the screws 462 are inserted, and functions as a positioning device for positioning the core blocks 404 in the Y-axis direction. In the present linear motor 400, the width of the central portion of each core block 404 as viewed in the X-axis direction is equal to the width on which the bobbin 414 is provided, so that the weight of the core block 404 can be reduced as compared with that of a core block having a connecting portion the width of which is larger than that of the flanges 406, 408. Even where the width of the fixing portion 412 is equal to that of the other portion of the core block 404, the present linear motor 400 can generate a sufficient thrust force to move the armature 402, owing to the lines of magnetic forces passing the screws 462 which are formed of a ferromagnetic material and which are inserted through the through holes 410 with substantially no gaps therebetween, like the screws 254 inserted through the through holes 156 in the first embodiment.

Figure 28:
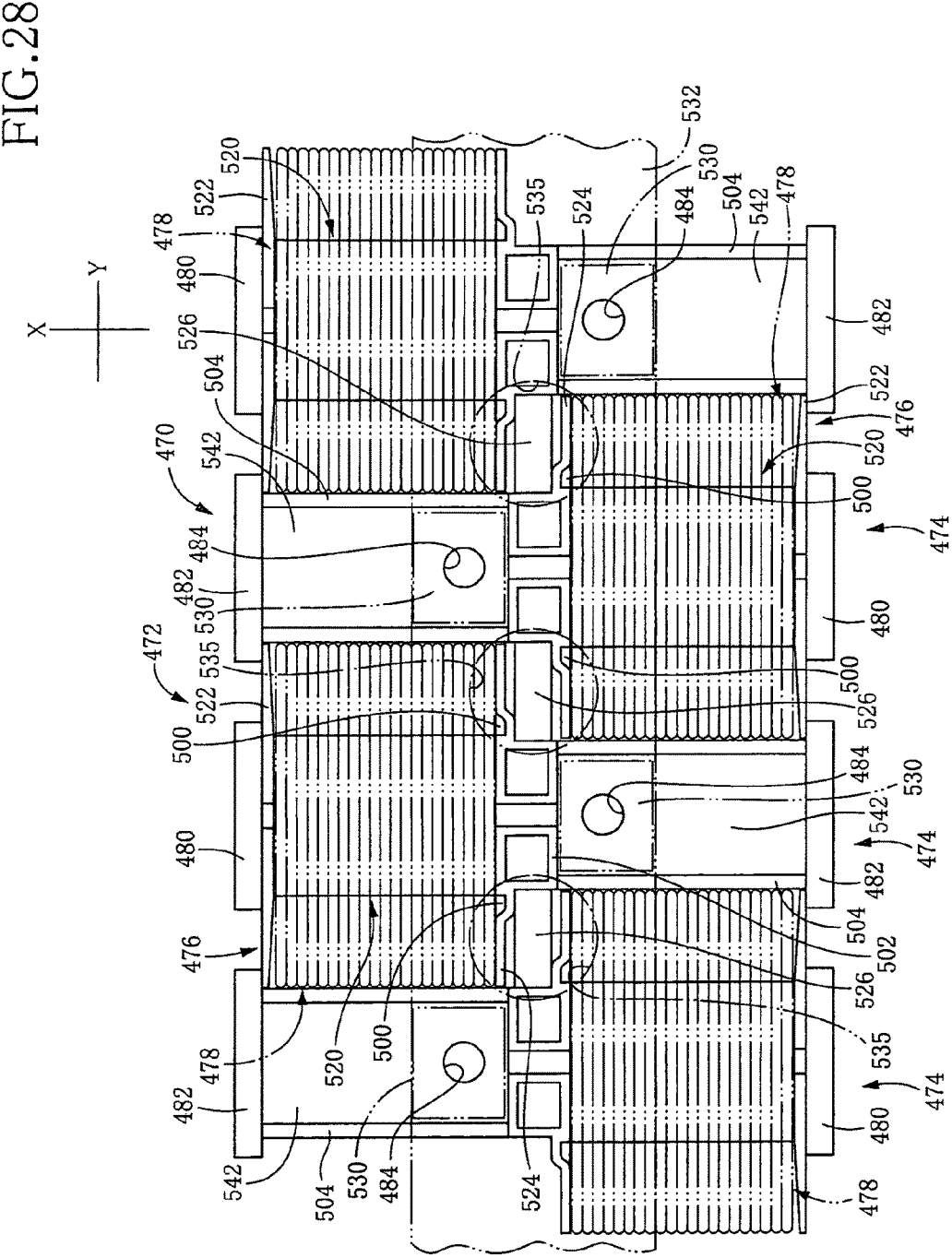
FIG. 28 is a plan view showing bobbins provided on respective core blocks in a longitudinal portion of an armature of a linear motor constructed according to a third embodiment of the invention, coils wound on the bobbins, and a beam member of a fixing device.
Figure 29:
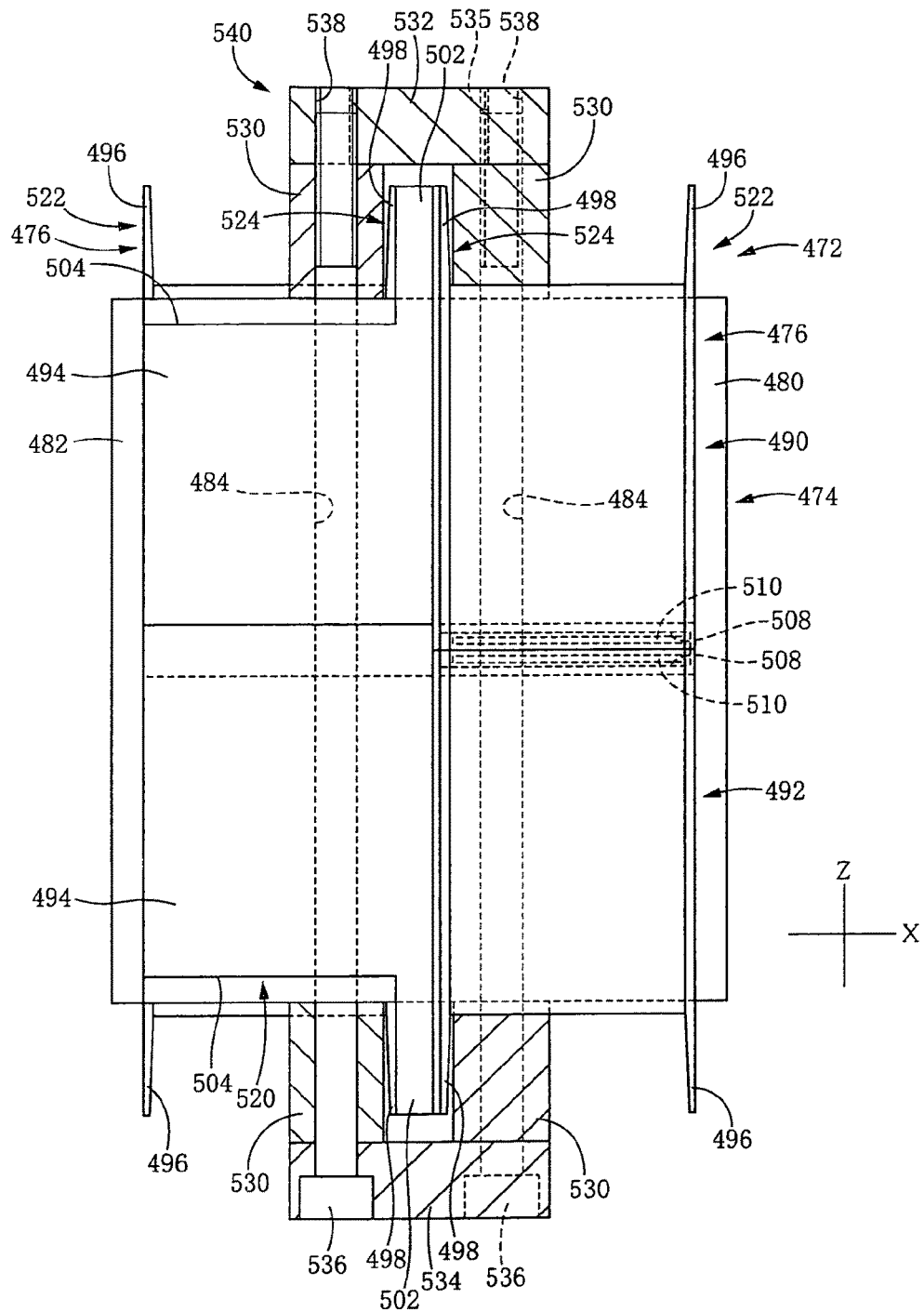
FIG. 29 is a front elevational view partly in cross section of one core block and the fixing device shown in FIG. 28.

Referring next to FIGS. 28 and 29, a linear motor 470 constructed according to a third embodiment of this invention will be described. As shown in FIG. 28, the present linear motor 470 includes an armature 472 having a plurality of core blocks 474. A bobbin 476 is provided at one end portion of each core block 474 as viewed in the X-axis direction, and a coil 478 is wound on the bobbin 476. Namely, each core block 474 functions as a core on which the coil 478 is wound. Each core block 474 takes the form of a generally rectangular plate having a generally rectangular shape in cross section taken in a vertical plane parallel to the X-axis and Z-axis directions and perpendicular to the Y-axis direction, and includes two flanges 480, 482 at the opposite ends of the rectangular plate as viewed in the X-axis direction. The core block 474 has a through hole 484 formed therethrough so as to extend in the Z-axis direction. A portion of the core block 404 in which the through hole 484 is formed is located between a central position of the core block 474 as viewed in the X-axis direction and the end of the core block 474 at which the flange 482 is disposed.

As shown in FIG. 29, the bobbin 476 consists of two bobbin forming members 490, 492 having the same shape and dimensions. For example, the bobbin forming member 490 includes a sleeve portion 494 which has a length equal to a distance between the flanges 480, 482 at the respective ends of the core block 474, and further includes a pair of outward flange portions 496, 498 which outwardly extend from the sleeve portion 494. The outward flange portion 496 is located at one end of the sleeve portion 494 as viewed in the X-axis direction, while the other outward flange 498 is located at a part of the sleeve portion 494 between the above-described one end and a central position of the sleeve portion 494 as viewed in the X-axis direction. The outward flange portion 498 has two grooves 500 formed in its inner surface, and a rib 502 formed on its outer surface. The sleeve portion 494 has openings 504 formed so as to extend in the Y-axis direction through a part of a bottom wall portion thereof which is located between the rib 502 and its end remote from the outward flange 496. Further, the bobbin forming member 490 has a slit 508 formed through one of a pair of side wall parts of the sleeve portion 494, as shown in FIG. 29. This slit 508 is formed between the two outward flange portions 496, 498. The bobbin forming member 490 further has a protrusion 510 formed on the other of the pair of side wall parts.

As shown in FIG. 29, the bobbin forming members 490, 492 are fitted on the core block 474 and butted together in the Z-axis direction, to constitute the bobbin 476, while the protrusions 510 are held in engagement with the slits 508. The bobbin 476 includes a square sleeve portion 520, and a pair of outward flanges 522, 524 which outwardly extend from two positions of the square sleeve portion 520, which two positions are located between the end of the square sleeve portion 520 on the side of the flange 482 and a central position of the square sleeve portion 520 as viewed in the X-axis direction. The coil 478 is wound on the bobbin 476 of each core block 476, in the same manner as the coils 140 wound on the core block 142 in the first embodiment, except in that the two coils 140 are wound on the core block 142. As shown in FIG. 28, the plurality of core blocks 474 are arranged in the Y-axis direction such that the two adjacent core blocks 474 180 are reversed in the X-axis direction with 180° rotation with respect to each other, so that the coils 478 are arranged in two rows parallel to the two rows of permanent magnets (not shown) which extend in the Y-axis direction and which are spaced from each other in the X-axis direction. The coils 478 arranged in the two rows between the two rows of permanent magnets are diposed in the zigzag pattern such that the axis of each of the coils 478 of one of the two rows is interposed between the axes of the adjacent two coils 478 of the other row. Further, gaps 526 are formed between the outward flanges 524 of the bobbins 476 of the adjacent core blocks 474, as shown in FIG. 28. The outward flange 524 is located nearer to the central position of each core block 474, in the X-axis direction, than the outward flange 522. The lower end portions of the heat pipes (not shown) are inserted in the gaps 526.

The plurality of core blocks 474 are fixed together by beam members 532, 534 held in abutting contact with the upper and lower end faces of each core block 474 which are opposed to each other in the Z-axis direction and which are exposed to the ambient air through the openings 504 formed through the bobbin 476. Spacers 530 are interposed between the above-described upper and lower end faces of the core blocks 474 and the respective beam members 532, 534. The upper beam member 532 takes the form of a plate, and has openings 535 for avoiding interferences with heat pipes (not shown), as shown in FIG. 28. As shown in FIG. 29, fastening members in the form of screws 536 are inserted through the through holes 484 from the side of the lower beam member 534 and screwed into tapped holes 538 formed in the upper beam member 532. The upper and lower beam members 532, 534 are forced against the respective upper and lower end faces of the core blocks 474 via the spacers 530, so that the plurality of core blocks 474 are fixed together. In the present linear motor 470, the beam members 532, 534, screws 536, tapped holes 538 and spacers 530 cooperate to constitute a fixing device 540. The fixing device 540 also functions as a positioning device for positioning the core blocks 474 in the Y-axis direction. A portion of each core block 474 on which the coil 478 is not wound functions as a spacer for arranging the coils 478 in the zigzag pattern on the core blocks 474. This portion of the core block 474 constitutes a fixing portion 542. The spacer portion also functioning as the fixing portion 542 makes it possible to reduce the length and weight of each core block 474, as compared with a core block which has the connecting portion in addition to the coil winding portion and the connecting portion. Unlike the first and second embodiments of FIG. 21 and FIG. 26 in which the two coils 140, 416 are wound on each core block 142, 404 at the two positions that are spaced apart from each other in the X-axis direction, the present third embodiment is advantageous for easier winding of the coils 478 owing to the provision of only one coil 478 wound on each core block 474, and for reduced number of the outward flanges 522, 524 and reduced length and weights of the core blocks 474 owing to the provision of only one pair of outward flanges 522, 524 on each core block 474. The spacers 530 and beam members 532, 534 are all formed of aluminum alloy materials, and have accordingly reduced weights, making it possible to reduce an increase of the weight of the armature 472 due to the spacers 530 and beam members 532, 534 and to permit an advantage of the reduced weight of the core blocks 474 owing to their reduced size.

Figure 30:
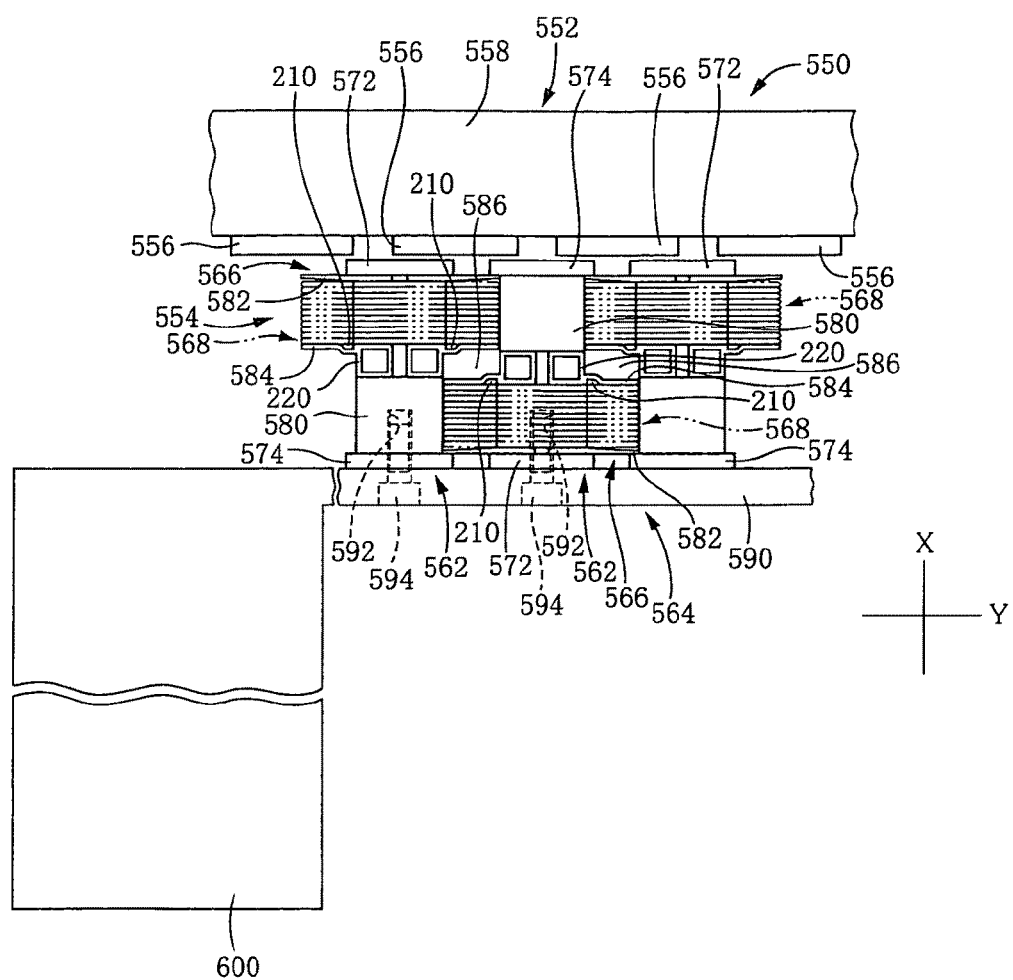
FIG. 30 is a plan view showing a portion of a linear motor constructed according to a fourth embodiment of this invention.
Figure 31:
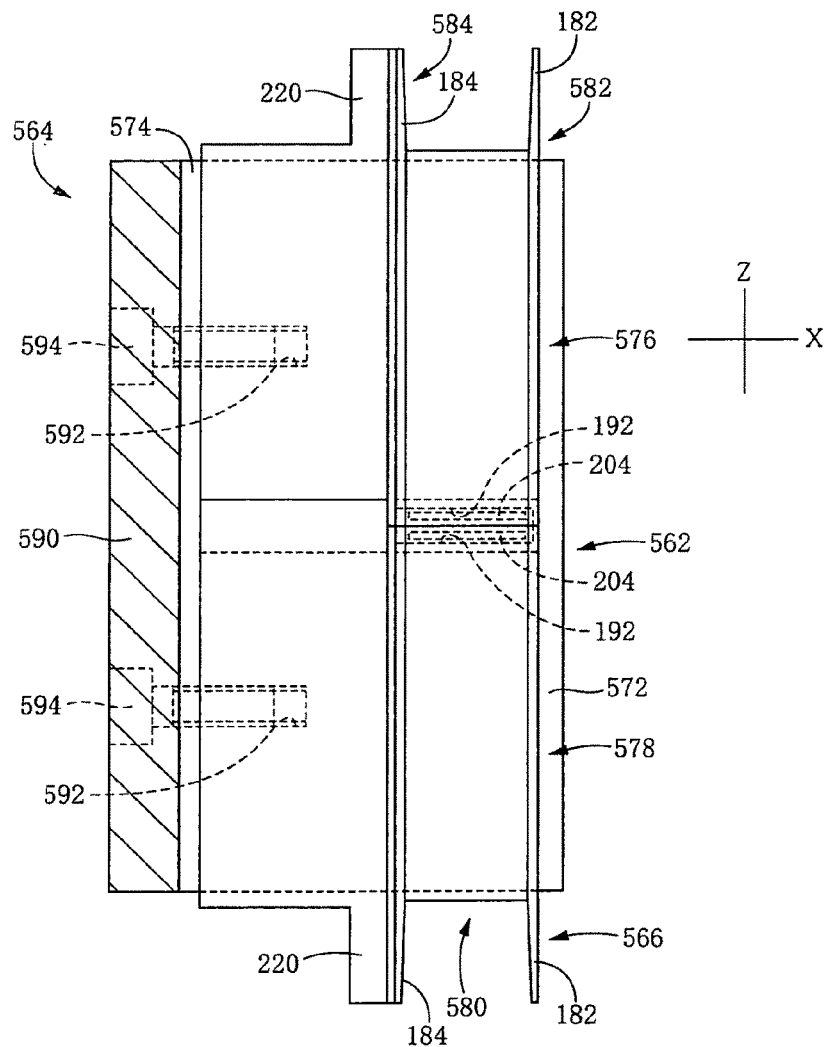
FIG. 31 is a front elevational view partly in cross section showing a bobbin provided on one core block of an armature of the linear motor shown in FIG. 30, and a fixing device.

A fourth embodiment of the present invention is shown in FIGS. 30 and 31. A linear motor 550 has only one permanent magnet row 552 extending in the Y-axis direction, and an armature 554 extending parallel to the permanent magnet row 552. The permanent magnet row 552 consists of a plurality of permanent magnets 556 fixed to an elongate yoke 558 extending in the Y-axis direction such that the permanent magnets 556 are equally spaced apart from each other, with an alternate change of their polarities. The armature 554 includes a plurality of mutually independent core blocks 562 fixed together by a fixing device 564 (which will be described), and a coil 568 is wound on a bobbin 566 provided on each core block 562. That is, the core block 562 functions as a core on which the coil 568 is wound.

Each core block 562 takes the form of a generally rectangular plate having a generally rectangular shape in cross section taken in a vertical plane parallel to the X-axis and Z-axis directions and perpendicular to the Y-axis direction, and includes two flanges 572, 574 at the opposite ends of the rectangular plate as viewed in the X-axis direction. Like the bobbin 170 in the first embodiment, the bobbin 566 consists of two bobbin forming members 576, 578 which are identical in construction with the bobbin forming members 172, 174. The two bobbin forming members 576, 578 are butted together in the X-axis direction, and includes a square sleeve portion 580, and a pair of outward flange portions 582, 584 which outwardly extend from two positions of the square sleeve portion 580, which are located between one of the opposite ends and a central position of the square sleeve portion 580.

The present linear motor 550 is also a three-phase alternating-current linear motor wherein the coil 568 is wound between the pair of outward flanges 582, 584 of the square sleeve portion 580. The coils 568 of the same phase are wound continuously on the three core blocks 562 which are arranged in series, as described above by reference to FIG. 20A with respect to the core blocks 142. After the three coils 568 are wound on the three core blocks 562 arranged in series, these three core blocks 562 are arranged in the Y-axis direction, in parallel with each other, as shown in FIG. 30 such that the second core block 562 is reversed in the X-axis direction with respect to the first and third core blocks 562, with the second core block 562 being rotated through 180° about a vertical axis parallel to the Z-axis direction, such that the coils 568 wound on the core blocks 562 are arranged in the zigzag pattern, and such that a gap 586 is left between the outward flanges 584 of the adjacent core blocks 562, which outward flanges 584 are located nearer to the central position of each core block 562, than the other outward flanges 582. The lower end portions of the heat pipes (not shown) are inserted in the respective gaps 586 formed between the adjacent core blocks 562.

As shown in FIG. 30, the plurality of core blocks 562 on which the coils 568 have been wound are fixed to a fixing member 590 in the form of an elongate plate held in abutting contact with the flanges 572, 574 located at one end of each core block 562 that is remote from the yoke 558 in the X-axis direction. The core blocks 562 have respective tapped hole 592 formed so as to extend in the X-axis direction, and fastening members in the form of screws 594 are inserted through holes formed through the fixing member 590 and screwed into the tapped holes 592 in the core blocks 562. The two tapped holes 592 are formed in each core block 562 at two positions that are spaced apart from each other in the Z-axis direction, as shown in FIG. 31, and the two screws 594 are screwed into the respective two tapped holes 592 in each core block 562, so that the plurality of core blocks 562 are fixed to the fixing member 590 such that the core blocks 562 are arranged in the Y-axis direction with a predetermined spacing pitch. It will be understood that the fixing member 590, tapped holes 592 and screws 592 cooperate to constitute the fixing device 564. The fixing device 564 has a high degree of accuracy in the diameter and position of the tapped holes 592 and the holes in which the screws 594 are inserted, and functions as a positioning device for positioning the core blocks 562 in the Y-axis direction.

To the opposite end portions of the fixing member 590 as viewed in the Y-axis direction, there are fixed respective two arm portions 600 in the form of rectangular plates, which extend in the X-axis direction and in the direction opposite to the direction in which the core blocks 562 extend from the fixing member 590, as shown in FIG. 30. These arm portions 600 constitute a connecting portion to which the leg portions of the Y-axis slide 68, 70 are bolted.

In the present linear motor 550, too, the armature 554 is moved to move the Y-axis slide 68, 70, by a thrust force generated by application of the electric current to the coils 568. The heat generated by the coils 568 is radiated by the heat pipes and the plurality of fins fixed to the heat pipes. The fixing member 590 and screws 594 are formed of a ferromagnetic material, and are subjected to lines of magnetic forces, so that the thrust force is generated.

Figure 32:
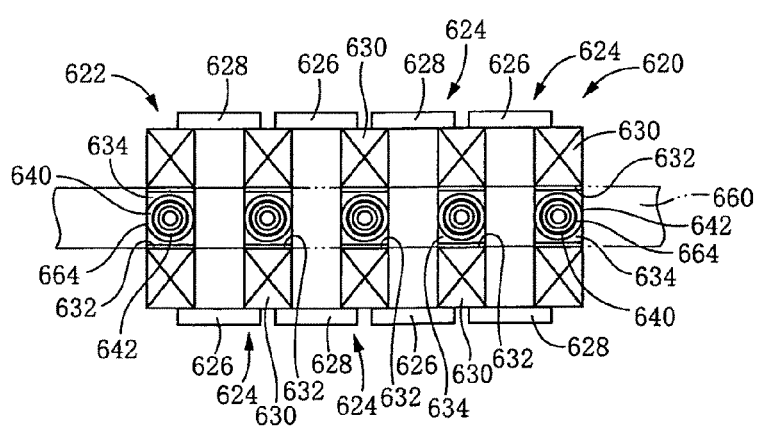
FIG. 32 is a plan view schematically showing a longitudinal portion of an armature of a linear motor constructed according to a fifth embodiment of the invention.
Figure 33:
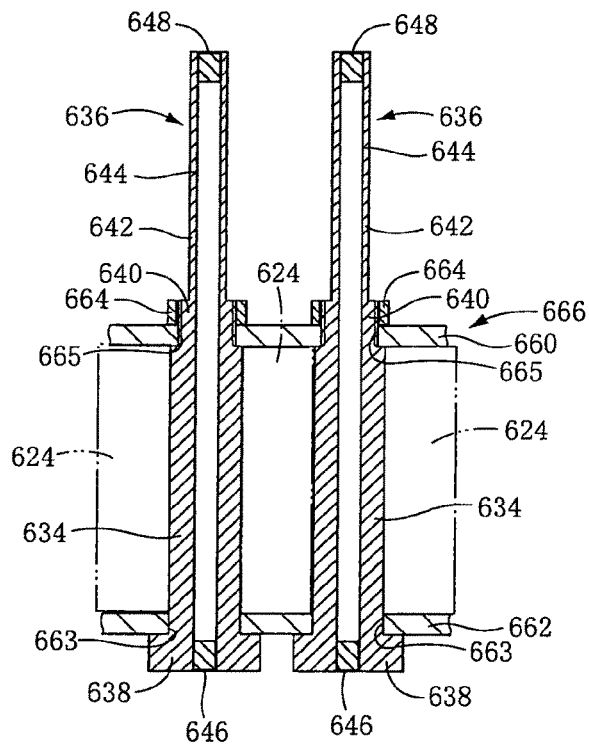
FIG. 33 is a side elevational view in cross section showing spacers and heat pipes that are disposed between two adjacent core blocks of the armature shown in FIG. 32.

The plurality of mutually independent core blocks of the armature of the linear motor may be fixed together by spacers in addition to beam members, as in a fifth embodiment of this invention shown in FIGS. 32 and 33.

The linear motor 620 according to the present fifth embodiment has two rows of permanent magnets (not shown), and an armature 622 including a plurality of core blocks 624 each of which takes the form of a generally rectangular plate having a generally rectangular shape in cross section taken in a vertical plane parallel to the X-axis and Z-axis directions and perpendicular to the Y-axis direction, and includes two flanges 626, 628 at the opposite ends of the rectangular plate as viewed in the X-axis direction. As in the linear motor 470 of the third embodiment of FIG. 26 wherein the coils 478 are wound on the core blocks 478, one coil 630 is wound at one end portion of each core block 624 as viewed in the X-axis direction. Like the bobbin 476 in the third embodiment, a bobbin (not shown) provided on each core block 624 includes a square sleeve portion and a pair of outward flanges. Like the coils 478 in the third embodiment, the coils 630 are wound on the adjacent core blocks 624 such that the coils 630 are arranged in a zigzag pattern, and such that a gap 632 is left between outward flanges of the adjacent core blocks 624, which outward flanges are located nearer to the central position of each core block 624, than the other outward flanges. Spacers 634 are disposed in the respective gaps 632. Rectangles with "X" marks located therein schematically represent the bobbins and the coils 630 wound on the bobbins. The square sleeve portion of each bobbin has openings formed in a portion of the bottom wall which corresponds to the gap 632 in the X-axis direction. The openings are formed through the bottom wall in the Y-axis direction. The upper and lower end surfaces of the portions of the core blocks 474 adjacent to the gaps 632 are exposed to the ambient air through the above-described openings.

Each of the spacers 634 is a prism having a rectangular shape in transverse cross section and is formed of a non-magnetic metallic material such as an aluminum alloy, for example. The spacer 634 is fitted in the gap 632 while being sandwiched by and between central portions of the adjacent core blocks 624 as viewed in the X-axis direction, thereby positioning the core blocks 624 in the Y-axis direction. The spacer 634, which constitutes a lower end portion of a heat pipe 636 as viewed in the Z-axis direction, includes a lower end portion in the form of a head portion 638, and an upper end portion in the form of an externally threaded portion 640, as shown in FIG. 33. A hollow sleeve portion 642 is formed integrally and coaxially with the spacer 634, so as to extend upwardly from the upper end of the externally threaded portion 640. A through hole 644 is formed through the spacer 634 (head portion 638 and externally threaded portion 640) and the hollow sleeve portion 642. This through hole 644 is closed at its opposite ends by respective plug members 646, 648, and is provided on its inner circumferential surface with a capillary layer impregnated with a heat carrier liquid. The spacer 634 cooperates with the hollow sleeve portion 642 to constitute the heat pipe 636.

The coils 630 are wound on respective bobbins provided on the plurality of core blocks 624, such that the coils 630 on the adjacent core blocks 624 are arranged in a zigzag pattern. The core blocks 624 are fixed together by upper and lower beam members 660, 662 in the form of plates which are held in abutting contact with the respective upper and lower surfaces of each core block 624 that are exposed to the ambient air through openings formed through each bobbin. The spacers 630 are inserted into the respective gaps 632 through holes 663 formed through the lower beam member 662. The externally threaded portion 640 of each spacer 634 and the hollow sleeve portion 642 extend upwards from the upper beam member 660 through a through hole 665 formed through the upper beam member 660. A nut 664 is screwed on the externally threaded portion 640 of the spacer 634. The spacer 634 has a length in the Z-axis direction, which is made shorter than that of the core block 624 by an amount within a predetermined dimensional tolerance, and the upper and lower beam members 660, 662 are forced against the respective upper and lower surfaces of the core blocks 624, to fix the core blocks 624 together with a high degree of positioning accuracy. It will be understood that the beam members 660, 662, externally threaded portion 640 and nuts 664 cooperate to constitute a fixing device 666.

Heat generated by the coils 630 upon application of the electric current thereto is conducted to the spacers 634, from which the heat is radiated by the heat pipes 636. Each heat pipe 636 is provided, at its portion projecting out of the gap 632, with heat radiating fins (not shown). In the absence of through holes formed through the core blocks 624, lines of magnetic forces generated by application of the electric current to the coils 6330 pass through an entirety of each core block 624. Each spacer 634 constitutes one end portion of the heat pipe 636, and the externally threaded portion 640 is formed coaxially with the heat pipe 636, so that the spacer 634 has a smaller surface area in transverse cross section, than a spacer having a hole in which a separate heat pipe is inserted and a through hole through which a screw extends to fix the core block to the beam member. In the present embodiment, the spacer 634 provides the heat pipe 636, and the core blocks 624 can be easily fixed together by the spacers 634 in addition to the beam members 660, 662.

Where a spacer are disposed between the adjacent two core blocks, a heat pipe may be provided separately from the spacer. In this case, an end portion of the heat pipe is inserted in a hole formed in the spacer, as in a sixth embodiment which will be described by reference to FIG. 34.

Figure 34:
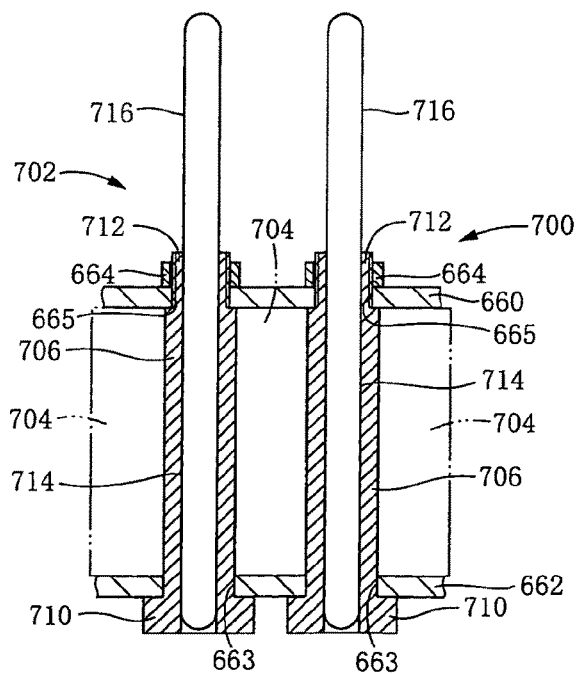
FIG. 34 is a side elevational view in cross section showing spacers and heat pipes that are disposed between two adjacent core blocks of an armature of a linear motor constructed to a sixth embodiment of this invention.

In a linear motor 700 having an armature 702 shown in FIG. 34, each spacer 706 disposed between the adjacent two core blocks 704 so as to extend in the Z-axis direction is formed of an aluminum alloy, and includes a lower end portion in the form of a head portion 710, and an upper end portion in the form of an externally threaded portion 712. The spacer 706 has a through hole 714 in which the lower end portion of a heat pipe 716 is inserted. The heat generated by application of the electric current to the coils is conducted from the spacer 706 to the heat pipe 716, and is radiated upwardly. An upper end portion of the heat pipe 716 extending upwardly from the through hole 714 is provided with radiating fins (not shown). In the other aspects, the linear motor 700 is identical with the linear motor 620 of the fifth embodiment of FIGS. 32 and 33. The same reference signs used in the fifth embodiment are used in the present sixth embodiment to denote the functionally same elements, which will not be described redundantly.

The first embodiment of FIG. 21 wherein the two coils 140 are wound at the respective two positions of each core block 142 in the X-axis direction may be modified such that through holes like the through holes 484 provided in the third embodiment of FIGS. 28 and 29 are formed in non-coil-winding portions of the core blocks 142 so that screws are inserted through the through holes and two beam members, to fix the core blocks 142 together, so as to permit the coils 140 to be arranged in the zigzag pattern. In this case, the core blocks 142 are modified to have a constant width dimension in the Y-axis direction over the entire length thereof in the X-axis direction, which constant width dimension is equal to the width of the coil winding portion. The thus modified core blocks 142 is small-sized in the absence of the exclusive fixing portion 150 in the X-axis direction for fixing the core blocks 142 together.

Further, the first embodiment wherein the two coils 140 are wound at the respective two positions of each core block 142 in the X-axis direction may be modified such that the core blocks 142 are fixed together by spacers in addition to the two beam members 250, 252. In this case, the core blocks 142 are modified to be identical in construction with the core blocks 404 in the second embodiment of FIGS. 26 and 27, except for the elimination of the through holes 410 formed through the fixing portions 412 in the second embodiment, and a spacer having a though hole is disposed between the fixing portions 412 of the adjacent core blocks 142 so that a screw is inserted through the through hole and screwed into a tapped hole formed in one of two beam members, to force the two beam members against the upper and lower end faces of each fixing portion in the Z-axis direction for thereby fixing the core blocks 142 together. These spacers may be identical with the spacers 634 in the fifth embodiment of FIGS. 32 and 33, each of which has the externally threaded portion 640 and is formed integrally with the heat pipe 636, or alternatively identical with the spacers 706 in the sixth embodiment of FIG. 34, which has the externally threaded portion 712 and through which the lower end portion of the heat pipe 716 is inserted. In this case, the three heat pipes are disposed at respective three positions of each core block 142 in the X-axis direction.

The bobbin may consist of two members obtained by dividing each of a pair of side wall parts of a sleeve portion extending in the Z-axis direction, at two different planes of division spaced apart from each other in the X-axis direction. In this case, the two planes of division may be planes for dividing the bobbin either symmetrically or asymmetrically.

The linear motor according to the present invention may have a single row of permanent magnets or mutually opposed two parallel rows of permanent magnets. Further, the linear motor has a plurality of cores that are formed integrally with each other on a one-piece body such that the cores are arranged along a straight line parallel to the Y-axis direction (second direction) in which the permanent magnet row or rows and the armature are moved relative to each other.

Where the linear motor is of a three-phase alternating current type, each set of core blocks of the armature for each of the three phases need not consist of three adjacent core blocks, and may consist of a single core block, two adjacent core blocks or four or more adjacent core blocks. In the illustrated first embodiment, for example, the armature 130, 132 includes the two sets of coils 140 each set consisting of the three groups of coils 140 of the respective different phases U, V and W. However, the armature 130, 132 includes only one set of coils 140, or three or more sets of coils 140.

Further, the first embodiment of FIG. 21 wherein the two bobbins 170 are provided on each core block 142 may be modified to use two different kinds of core blocks each having the two bobbins, one of which has two pairs of two outward flanges 232, 234 located adjacent to the respective two flanges 146, 148, and the other of which has two pairs of outward flanges 232, 234 located near and on respective opposite sides of the central position of the core block in the X-axis direction (near the fixing portion 150). In this case, the two different kinds of core blocks are alternately arranged so that the six coils are arranged in the zigzag pattern such that a gap is formed in the X-axis direction between the coils of the adjacent core blocks. Where the six coils of the same phase are wound on the adjacent three core blocks, the two core blocks of one of the two kinds and one core block of the other kind, for example, are alternately arranged in series with each other such that the core block of the above-indicated other kind is sandwiched between the two core blocks of the above-indicated one kind. Then, the conductive wire is wound on the three core blocks to form the six coils, in the same manner as described above by reference to FIG. 20A. Subsequently, the three core blocks are re-arranged in parallel with each other, with the second core block being rotated through 180° about a vertical axis parallel to the Z-axis direction.

In the modified arrangement described above, the two bobbins provided on each core block are reversed in the X-axis direction, with one of the two bobbins being rotated through 180° about the vertical axis parallel to the Z-axis direction. Each bobbin has the four grooves 210, so that the beginning end portion of the conductive wire to be wound on each bobbin is provided in the grooves 210 to guide the conductive wire into contact with the opposite outer side surfaces of the square sleeve portion 230. Further, when the conductive wire is wound on the three core blocks of the two different kinds arranged in series with each other, the three core blocks may be set in series with each other in the positioning jig, irrespective of the orientation of each core block in the direction of arrangement of the three core blocks in series, and in either one of the two angular positions (different from each other by 180° of the core blocks about a horizontal axis parallel to the X-axis direction.

In the linear motors 72, 74 according to the first embodiment of FIGS. 1-25, one of the two bobbins 170 is provided on each core block such that the two outward flanges 232, 234 are located adjacent to the fixing portion 150, while the other bobbin 170 is provided on the core block 142 such that the two outward flanges 232, 234 are located adjacent to the flange 146. The provision of the two grooves 210 is sufficient to permit the coils 140 to be wound on the two bobbins 170 irrespective of the orientation of the core block in the direction of arrangement in series with each other in the positioning jig. However, the provision of the four-grooves 210 permit the coils 140 to be wound on the two bobbins 170 on the two kinds of core blocks 142 in which the bobbins 170 are located at the respective different positions in the X-axis direction as described above, and to permit the coils 140 to be arranged in the zigzag pattern.

The head moving device 40, 42 of the electronic-circuit-component mounting machine may be modified to include two linear motors for moving the holder head 36, 38 in the respective X-axis and Y-axis directions in the horizontal plane parallel to the circuit board 18 as held by the board holding device 34.

What is claimed is:

1. A linear motor including two permanent magnet rows each of which consists of a plurality of permanent magnets fixed on an elongate yoke such that polarities of the permanent magnets alternately change and which are opposed to each other, and an armature including a plurality of cores and a, plurality of coils wound on the respective cores, wherein the armature is disposed between the two permanent magnet rows such that the cores of the armature opposes to the two permanent magnet rows in a first direction perpendicular to each of the two permanent magnet rows, and the armature is moved relative to the two permanent magnet rows along a straight line by application of an electric current to the coils, wherein an improvement comprises:

each of the plurality of cores extending in the first direction, and the plurality of cores being arranged in a second direction parallel to the straight line and perpendicular to the first direction, the plurality of coils being disposed on the plurality of cores such that the coils on the cores adjacent to each other in the second direction are arranged in a zigzag pattern and are spaced apart from each other in the first direction, with a gap left therebetween in the first direction, wherein the armature further includes a heat pipe having opposite end portions wherein one of which is inserted in the gap and the other of which extends outwardly of the gap, the armature further including a plurality of fins fixed to the above-indicated other of the opposite end portions of the heat pipe, wherein the plurality of cores are provided by a plurality of mutually independent core blocks, and the armature further includes a fixing device by which the plurality of mutually independent core blocks are fixed to each other, and wherein the fixing device includes (a) two beam members disposed on respective end faces of the core blocks that are opposed in a third direction perpendicular to the first and second directions, and (b) fastening members which force the two beam members against the respective end faces of the mutually independent core blocks, for fixing the core blocks together.

2. The linear motor according to claim 1, wherein the plurality of cores consist of two parallel arrays of cores Which correspond to the two permanent magnet rows, each of the cores of each of the two parallel arrays extending in the first direction, and wherein the coils wound on the cores of each of the two parallel arrays are arranged in the zigzag pattern such that the gap in which said one end portion of the heat pipe is inserted is formed in the first direction between the coils wound on the cores adjacent to each other in the second direction.

3. The linear motor according to claim 1, wherein the coil wound on a portion of each of the plurality of core blocks which is opposed to one of the two permanent magnet rows and the coil wound on a portion of each of the plurality of core blocks which is opposed to the other of the two permanent magnet rows are arranged in the zigzag pattern such that the gap is formed in the first direction between the coils wound on the cores adjacent to each other in the second direction, and the one end portion of the heat pipe is inserted in the gap.

4. The linear motor according to claim 1, wherein each of the plurality of core blocks takes the form of a generally rectangular plate including two flanges formed at respective opposite ends thereof, and the armature further includes a plurality of spacers each interposed between central portions in the first direction of adjacent ones of the plurality of core blocks arranged in the second direction, the spacers being formed of an aluminum alloy material.

5. The linear motor according to claim 1, wherein each of the plurality of core blocks takes the form of a generally rectangular plate including two flanges formed at respective opposite ends thereof and having a through hole formed therethrough in the third direction, and wherein each of the fastening members is inserted through the through holes of the core blocks to connect the two beam members to each other and to force the two beam members against the respective end faces of the core blocks, for fixing the core blocks together.

6. The linear motor according to claim 4, wherein each of the plurality of spacers constitutes said one of the opposite end portions of the heat pipe.

7. The linear motor according to claim 4, wherein each of the plurality of spacers has a hole in which said one of the opposite end portions of the heat pipe is inserted.

8. The linear motor according to claim 4, wherein each of the plurality of spacers connects the two beam members to each other and forces the two beam members against the respective end faces of the core blocks, for fixing the core blocks together.

9. The linear motor according to claim 1, further comprising a covering member which covers the plurality of fins fixed to the plurality of heat pipes and which cooperates with the armature to define an air flow passage extending in the second direction, and at least one fan disposed in at least one of opposite end portions of the air flow passage, to generate a flow of air through the air flow passage.

10. The linear motor according to claim 1, wherein each of the plurality of cores has a bobbin on which the coil is wound and which includes a sleeve portion, and a pair of outward flanges outwardly extending in the second direction from respective two positions of the sleeve portion which are located between one of opposite ends and a central position of the sleeve portion as viewed in the first direction, and wherein adjacent ones of the plurality of cores are oriented in opposite directions in the first direction with 180° rotation with respect to each other so that the coils wound between the pair of outward flanges of the bobbins of the adjacent cores are arranged in the zigzag pattern in the second direction, the gap in which said one end portion of the heat pipe is inserted being formed in the first direction between an outer surface of one of the pair of outward flanges of one of the two adjacent cores and an outer surface of the corresponding one of the pair of outward flanges of the other of the two adjacent cores.

11. The linear motor according to claim 1, wherein each of the plurality of cores has a bobbin having a rectangular shape in transverse cross section, the bobbin including a square sleeve portion on which the coil is wound and which is formed of a non-electrically-conductive material, and a pair of outward flanges outwardly extending in the second direction from respective two positions of the square sleeve portion which are spaced from each other in the first direction, each of at least one of the pair of outward flanges having, in an inner surface thereof opposed to an inner surface of the other outward flange, a groove which is contiguous with a side surface of the square sleeve portion and which extends to an outer edge of the inner surface, to guide a beginning end portion of a conductive wire of the coil from the outer edge of the inner surface to come into contact with the side surface of the square sleeve portion, and to permit the other portion of the conductive wire of the coil to be wound on the square sleeve portion.

12. The linear motor according to claim 1, wherein each of the plurality of cores has a bobbin having a rectangular shape in transverse cross section, the bobbin including a square sleeve portion on which the coil is wound, and a pair of outward flanges outwardly extending the second direction from respective two positions of the square sleeve portion which are spaced from each other in the first direction, and wherein the bobbin consists of two members formed of a non-electrically-conductive material and respectively having a first engaging portion and a second engaging portion, the two members being butted together in the third direction, with the first and second engaging portions being held in engagement with each other, to form the bobbin.

13. The linear motor according to claim 1, which is operated with an alternating current having three phases consisting of a U phase, a V phase and a W phase, and wherein all of the coils of each of the U, V and W phases which are respectively wound on the cores adjacent to each other in the second direction are formed continuously of a single conductive wire.

14. A linear motor system comprising:
 a linear motor according to claim 1 wherein the second direction is a horizontal direction; and
 a covering member Which covers a space above the linear motor and which has at least one opening open upwards.

15. The linear motor system according to claim 14, further comprising at least one exhaust fan each exhaust in a corresponding one of the at least opening of the covering member, to discharge air upwardly from the space within the covering member.

16. An electronic-circuit-component mounting machine comprising:
 a component supply device configured to supply electronic circuit components;
 a board holding device configured to hold a circuit board;
 a holder head configured to hold the electronic circuit component; and
 a head moving device configured to move the holder head to a desired position in a plane parallel to the circuit board as held by the board holding device,
 wherein the holder head receives the electronic circuit component from the component supply device and mounts the electronic circuit component on the circuit board held by the board holding device,
 and wherein the head moving device includes a linear motor according to claim 1.

17. The electronic-circuit-component mounting machine according to claim 16, further comprising a covering member which covers a space above the linear motor and which has at least one opening open upwards.

18. The electronic-circuit-component mounting machine according to claim 16, further comprising at least one exhaust fan each exhaust in a corresponding one of the at least opening of the covering member, to discharge air upwardly from the space within the covering member.

* * * * *